(12) United States Patent
Stepanian

(10) Patent No.: US 11,778,100 B2
(45) Date of Patent: Oct. 3, 2023

(54) CONSUMER ELECTRONIC REGISTRATION, CONTROL AND SUPPORT CONCIERGE DEVICE AND METHOD

(71) Applicant: NexStep, Inc., San Jose, CA (US)

(72) Inventor: Robert Stepanian, San Jose, CA (US)

(73) Assignee: NexStep, Inc., San Jose, CA (US)

( * ) Notice: Subject to any disclaimer, the term of this patent is extended or adjusted under 35 U.S.C. 154(b) by 0 days.

(21) Appl. No.: 17/061,300

(22) Filed: Oct. 1, 2020

(65) Prior Publication Data

US 2021/0021710 A1 Jan. 21, 2021

Related U.S. Application Data

(63) Continuation of application No. 15/864,872, filed on Jan. 8, 2018, now Pat. No. 10,798,244, which is a
(Continued)

(51) Int. Cl.
*G05B 15/02* (2006.01)
*H04M 1/72415* (2021.01)
(Continued)

(52) U.S. Cl.
CPC .......... *H04M 3/5235* (2013.01); *G05B 15/02* (2013.01); *G06F 1/1626* (2013.01);
(Continued)

(58) Field of Classification Search
CPC .. G05B 15/02; G06Q 30/0241; G06F 1/1626; G06F 1/1684; G06F 1/1698; G06F 21/10;
(Continued)

(56) References Cited

U.S. PATENT DOCUMENTS

| | | |
|---|---|---|
| 5,410,326 A | 4/1995 | Goldstein |
| 5,546,471 A | 8/1996 | Merjanian |

(Continued)

FOREIGN PATENT DOCUMENTS

| | | |
|---|---|---|
| CN | 1845505 A | 10/2006 |
| CN | 101821720 A | 9/2010 |

(Continued)

OTHER PUBLICATIONS

Defendant Comcast's Initial Invalidity Contentions Pursuant to Paragraph 4(D) of the District of Delaware Default Standard for Discovery, Apr. 24, 2020, 200 pages.
(Continued)

*Primary Examiner* — Yuhui R Pan
(74) *Attorney, Agent, or Firm* — HAYNES BEFFEL & WOLFELD, LLP; Ernest J. Beffel, Jr.

(57) ABSTRACT

We disclose a concierge device that can be configured to register, control and support a consumer device. It can alternatively or redundantly connect to a home management bridge and/or cloud-based management servers. It can accept menus that allow a single concierge device to provide a wide range of functions for various consumer devices. The concierge device allows the user in a single action to initiate a support session, automatically identifying the consumer device. The concierge device can be configured for voice or video support calls. The concierge device in conjunction with a home management bridge or gateway can manage on boarding of components of an automated home, such as switches and lamps. Implementations of the concierge device that include a display can show supplemental information, such as advertising, optionally in coordination with media being played on a consumer device coupled in communication with the concierge device.

24 Claims, 12 Drawing Sheets

Related U.S. Application Data continuation of application No. 14/281,781, filed on May 19, 2014, now Pat. No. 9,866,697, which is a continuation of application No. 13/344,529, filed on Jan. 5, 2012, now Pat. No. 9,614,964.

(60) Provisional application No. 61/561,732, filed on Nov. 18, 2011, provisional application No. 61/530,370, filed on Sep. 1, 2011, provisional application No. 61/430,103, filed on Jan. 5, 2011, provisional application No. 61/430,099, filed on Jan. 5, 2011.

(51) Int. Cl.

| | | |
|---|---|---|
| *H04N 21/41* | (2011.01) | |
| *H04L 67/56* | (2022.01) | |
| *H04M 3/523* | (2006.01) | |
| *G06F 1/16* | (2006.01) | |
| *G08C 17/02* | (2006.01) | |
| *G06F 3/023* | (2006.01) | |
| *G06F 21/32* | (2013.01) | |
| *H04L 12/28* | (2006.01) | |
| *H04N 21/433* | (2011.01) | |
| *H04N 21/4223* | (2011.01) | |
| *H04L 67/303* | (2022.01) | |
| *H04L 69/24* | (2022.01) | |
| *H04N 21/472* | (2011.01) | |
| *H04L 41/00* | (2022.01) | |
| *H04N 21/4405* | (2011.01) | |
| *H04N 21/422* | (2011.01) | |
| *H04N 21/4623* | (2011.01) | |
| *G06Q 30/0241* | (2023.01) | |
| *H04N 21/4147* | (2011.01) | |
| *H04W 4/16* | (2009.01) | |
| *G06F 21/10* | (2013.01) | |
| *H04W 4/60* | (2018.01) | |
| *H04M 1/7246* | (2021.01) | |

(52) U.S. Cl.
CPC .......... *G06F 1/1684* (2013.01); *G06F 1/1698* (2013.01); *G06F 3/0231* (2013.01); *G06F 21/10* (2013.01); *G06F 21/32* (2013.01); *G06Q 30/0241* (2013.01); *G08C 17/02* (2013.01); *H04L 12/2818* (2013.01); *H04L 12/2834* (2013.01); *H04L 41/00* (2013.01); *H04L 67/303* (2013.01); *H04L 67/56* (2022.05); *H04L 69/24* (2013.01); *H04M 1/72415* (2021.01); *H04N 21/4147* (2013.01); *H04N 21/41265* (2020.08); *H04N 21/422* (2013.01); *H04N 21/4223* (2013.01); *H04N 21/42201* (2013.01); *H04N 21/4333* (2013.01); *H04N 21/4334* (2013.01); *H04N 21/4405* (2013.01); *H04N 21/4623* (2013.01); *H04N 21/47214* (2013.01); *H04W 4/16* (2013.01); *H04W 4/60* (2018.02); *G08C 2201/40* (2013.01); *H04M 1/7246* (2021.01); *H04M 2203/1016* (2013.01); *H04M 2250/12* (2013.01)

(58) Field of Classification Search
CPC ....... G06F 21/32; G06F 3/0231; G08C 17/02; G08C 2201/40; H04L 12/2818; H04L 12/2834; H04L 41/00; H04L 67/28; H04L 67/303; H04L 69/24; H04M 1/72415; H04M 1/7246; H04M 2203/1016; H04M 2250/12; H04M 3/5235; H04N 21/41265; H04N 21/4147; H04N 21/422; H04N 21/42201; H04N 21/4223; H04N 21/4333; H04N 21/4334; H04N 21/4405; H04N 21/4623; H04N 21/47214; H04W 4/16; H04W 4/60

See application file for complete search history.

(56) References Cited

U.S. PATENT DOCUMENTS

| | | |
|---|---|---|
| 5,650,831 A | 7/1997 | Farwell |
| 6,088,731 A | 7/2000 | Kiraly et al. |
| 6,097,441 A | 8/2000 | Allport |
| 6,185,535 B1 | 2/2001 | Hedin et al. |
| 6,505,087 B1 | 1/2003 | Lucas et al. |
| 6,687,778 B2 | 2/2004 | Ito et al. |
| 6,710,790 B1 | 3/2004 | Fagioli |
| 6,906,635 B1 | 6/2005 | Moutaux et al. |
| 6,947,675 B2 | 9/2005 | Koyama et al. |
| 6,970,098 B1 | 11/2005 | Adams et al. |
| 7,260,597 B1 | 8/2007 | Hofrichter et al. |
| 7,389,103 B2 | 6/2008 | Stepanian |
| 7,444,130 B2 | 10/2008 | Stepanian |
| 7,467,186 B2 | 12/2008 | Attar et al. |
| 7,526,539 B1 | 4/2009 | Hsu |
| 7,542,753 B2 | 6/2009 | Stepanian |
| 7,609,824 B2 | 10/2009 | Stepanian |
| 7,627,825 B2 | 12/2009 | Kakuda |
| 7,697,669 B2 | 4/2010 | Stepanian |
| 7,826,597 B2 | 11/2010 | Berner et al. |
| 7,907,710 B2 | 3/2011 | Stepanian |
| 8,233,803 B2 | 7/2012 | Meyer et al. |
| 8,494,132 B2 | 7/2013 | Stepanian |
| 9,141,150 B1 | 9/2015 | Trundle et al. |
| 9,294,800 B2 | 3/2016 | McMahon et al. |
| 9,304,827 B2 | 4/2016 | Werth et al. |
| 2002/0002707 A1 | 1/2002 | Ekel et al. |
| 2002/0044199 A1 | 4/2002 | Barzebar et al. |
| 2002/0045484 A1 | 4/2002 | Eck et al. |
| 2002/0059588 A1 | 5/2002 | Huber et al. |
| 2002/0073416 A1 | 6/2002 | Ramsey Catan |
| 2002/0092025 A1 | 7/2002 | Klumpp |
| 2002/0095269 A1 | 7/2002 | Natalini et al. |
| 2002/0143805 A1 | 10/2002 | Hayes et al. |
| 2002/0149705 A1 | 10/2002 | Allen et al. |
| 2002/0158812 A1 | 10/2002 | Pallakoff |
| 2002/0174444 A1 | 11/2002 | Gatto et al. |
| 2002/0180579 A1 | 12/2002 | Nagaoka et al. |
| 2003/0002479 A1 | 1/2003 | Vortman et al. |
| 2003/0004680 A1 | 1/2003 | Dara-Abrams et al. |
| 2003/0035075 A1 | 2/2003 | Butler et al. |
| 2003/0100293 A1 | 5/2003 | Hunt |
| 2003/0108227 A1 | 6/2003 | Philomin et al. |
| 2003/0171127 A1 | 9/2003 | White |
| 2003/0188322 A1 | 10/2003 | Bontempi |
| 2003/0210126 A1 | 11/2003 | Kanazawa |
| 2003/0228883 A1 | 12/2003 | Kusakari et al. |
| 2004/0008287 A1 | 1/2004 | Johnston et al. |
| 2004/0019395 A1 | 1/2004 | Maymudes |
| 2004/0024638 A1 | 2/2004 | Restis |
| 2004/0066308 A1 | 4/2004 | Sampsell |
| 2004/0070491 A1 | 4/2004 | Huang et al. |
| 2004/0087369 A1 | 5/2004 | Tanaka et al. |
| 2004/0110563 A1 | 6/2004 | Tanaka et al. |
| 2004/0174863 A1 | 9/2004 | Caspi et al. |
| 2004/0176170 A1 | 9/2004 | Eck et al. |
| 2004/0187157 A1 | 9/2004 | Chong et al. |
| 2004/0214562 A1 | 10/2004 | Adan et al. |
| 2004/0224638 A1 | 11/2004 | Fadell et al. |
| 2004/0227859 A1 | 11/2004 | Liang |
| 2004/0249925 A1 | 12/2004 | Jeon et al. |
| 2004/0249962 A1 | 12/2004 | Lecomte |
| 2005/0012723 A1 | 1/2005 | Pallakoff |
| 2005/0027539 A1 | 2/2005 | Weber et al. |
| 2005/0039214 A1 | 2/2005 | Lorenz et al. |
| 2005/0122649 A1 | 6/2005 | Yamamoto |
| 2005/0130744 A1 | 6/2005 | Eck et al. |
| 2005/0159823 A1 | 7/2005 | Hayes et al. |
| 2005/0181877 A1 | 8/2005 | Kuwahara et al. |

21/4333; H04N 21/4334; H04N 21/4405; H04N 21/4623; H04N 21/47214; H04W 4/16; H04W 4/60

(56) References Cited

U.S. PATENT DOCUMENTS

| | | |
|---|---|---|
| 2005/0187682 A1 | 8/2005 | Gault et al. |
| 2005/0197187 A1 | 9/2005 | Mitsuyoshi et al. |
| 2005/0262535 A1 | 11/2005 | Uchida et al. |
| 2005/0282634 A1 | 12/2005 | Yamada et al. |
| 2005/0282639 A1 | 12/2005 | Tanaka et al. |
| 2006/0020993 A1 | 1/2006 | Hannum et al. |
| 2006/0037045 A1 | 2/2006 | Hsieh |
| 2006/0040638 A1 | 2/2006 | McQuaide |
| 2006/0041923 A1 | 2/2006 | McQuaide |
| 2006/0052136 A1 | 3/2006 | Harris |
| 2006/0079329 A1 | 4/2006 | Yamada et al. |
| 2006/0106963 A1 | 5/2006 | Sasaki et al. |
| 2006/0107281 A1 | 5/2006 | Dunton |
| 2006/0208889 A1 | 9/2006 | Shaffer et al. |
| 2006/0271791 A1 | 11/2006 | Novack et al. |
| 2006/0282572 A1 | 12/2006 | Steinberg et al. |
| 2007/0011604 A1 | 1/2007 | Chiu |
| 2007/0018845 A1 | 1/2007 | Sutardja |
| 2007/0088701 A1 | 4/2007 | Rao |
| 2007/0096937 A1 | 5/2007 | Walrath |
| 2007/0121606 A1 | 5/2007 | Scheinert |
| 2007/0129106 A1 | 6/2007 | Liu |
| 2007/0183401 A1 | 8/2007 | Bennett |
| 2008/0003945 A1 | 1/2008 | Wenham |
| 2008/0015881 A1 | 1/2008 | Shankar |
| 2008/0034081 A1 | 2/2008 | Marshall et al. |
| 2008/0062034 A1 | 3/2008 | Harris et al. |
| 2008/0108388 A1* | 5/2008 | Ebrom ............... H04L 12/2825 714/E11.202 |
| 2008/0143489 A1 | 6/2008 | Castaldo et al. |
| 2008/0240376 A1 | 10/2008 | Conway et al. |
| 2008/0263621 A1 | 10/2008 | Austerlitz et al. |
| 2008/0312925 A1* | 12/2008 | Jaiswal ..................... H04Q 3/64 704/E15.001 |
| 2009/0009586 A1 | 1/2009 | Cassanova |
| 2009/0008300 A1 | 3/2009 | Sherman et al. |
| 2009/0070436 A1 | 3/2009 | Dawes et al. |
| 2009/0083000 A1* | 3/2009 | Sherman ............... H04M 15/00 702/184 |
| 2010/0179720 A1 | 7/2010 | Lin et al. |
| 2010/0262467 A1 | 10/2010 | Barnhill, Jr. et al. |
| 2010/0277300 A1 | 11/2010 | Cohn et al. |
| 2010/0280635 A1 | 11/2010 | Cohn et al. |
| 2011/0022641 A1 | 1/2011 | Werth et al. |
| 2011/0121943 A1 | 5/2011 | Morovitz et al. |
| 2011/0286586 A1 | 11/2011 | Saylor et al. |
| 2011/0293078 A1* | 12/2011 | Saylor .................. H04M 3/493 379/88.13 |
| 2011/0298581 A1 | 12/2011 | Hsu |
| 2012/0221502 A1 | 8/2012 | Jerram et al. |
| 2012/0265695 A1 | 10/2012 | Tuchman et al. |

FOREIGN PATENT DOCUMENTS

| | | |
|---|---|---|
| CN | 101895620 A | 11/2010 |
| JP | 2001095067 A | 4/2001 |
| JP | 2001195119 A | 7/2001 |
| JP | 2002162149 A | 6/2002 |
| JP | 2002315079 A | 10/2002 |
| JP | 2002543647 A | 12/2002 |
| JP | 2003116074 | 4/2003 |
| JP | 2003-163786 A | 6/2003 |
| JP | 2003-173207 A | 6/2003 |
| JP | 2003163786 A | 6/2003 |
| JP | 2003173207 A | 6/2003 |
| JP | 2003241827 A | 8/2003 |
| JP | 2003308130 A | 10/2003 |
| JP | 2003529959 A | 10/2003 |
| JP | 2004040656 A | 2/2004 |
| JP | 2004128859 A | 4/2004 |
| JP | 2004172695 A | 6/2004 |
| JP | 2004235962 A | 8/2004 |
| JP | 2005510965 A | 4/2005 |
| JP | 2005518741 A | 6/2005 |
| JP | 2005-184350 A | 7/2005 |
| JP | 2005184350 A | 7/2005 |
| JP | 2005196770 A | 7/2005 |
| JP | 2005354340 A | 12/2005 |
| JP | 2006100951 A | 4/2006 |
| JP | 2006120137 A | 5/2006 |
| JP | 2006262021 A | 9/2006 |
| JP | 2006332891 A | 12/2006 |
| JP | 2007316763 A | 12/2007 |
| JP | 2008187632 A | 8/2008 |
| JP | 2009212706 A | 9/2009 |
| JP | 2010220079 A | 9/2010 |
| WO | 00/65553 A1 | 11/2000 |
| WO | 01/05155 A1 | 1/2001 |
| WO | 0105155 A1 | 1/2001 |
| WO | 03005320 A3 | 3/2003 |
| WO | 2007041284 A2 | 4/2007 |
| WO | 2007041284 A3 | 5/2009 |

OTHER PUBLICATIONS

Exhibits A1-D6 to Defendant Comcast's Initial Invalidity Contentions Pursuant to Paragraph 4(D) of the District of Delaware Default Standard for Discovery, Apr. 24, 2020, 2462 pages.

Exhbits E1-N to Defendant Comcast's Initial Invalidity Contentions Pursuant to Paragraph 4(D) of the District of Delaware Default Standard for Discovery, Apr. 24, 2020, 1678 pages.

Defendant Comcast's First Supplemental Invalidity Contentions Pursuant to Paragraph 4(D) of the District of Delaware Default Standard for Discovery, Oct. 16, 2020, 202 pages.

Defendant Comcast's Amended Invalidity Contentions, Dec. 3, 2020, 181 pages.

Exhbit N2 to Defendant Comcast's Amended Invalidity Contentions, Dec. 3, 2020, 59 pages.

Exhbit O to Defendant Comcast's Amended Invalidity Contentions, Dec. 3, 2020, 95 pages.

Exhbit P to Defendant Comcast's Amended Invalidity Contentions, Dec. 3, 2020, 66 pages.

Exhbit Q to Defendant Comcast's Amended Invalidity Contentions, Dec. 3, 2020, 47 pages.

Exhbit R to Defendant Comcast's Amended Invalidity Contentions, Dec. 3, 2020, 99 pages.

Exhbit S to Defendant Comcast's Amended Invalidity Contentions, Dec. 3, 2020, 33 pages.

Exhbit V to Defendant Comcast's Amended Invalidity Contentions, Dec. 3, 2020, 83 pages.

Exhbit W to Defendant Comcast's Amended Invalidity Contentions, Dec. 3, 2020, 50 pages.

Exhbit X to Defendant Comcast's Amended Invalidity Contentions, Dec. 3, 2020, 28 pages.

Exhbits Z1-Z-6 to Defendant Comcast's Amended Invalidity Contentions, Dec. 3, 2020, 786 pages.

CN 201810380637.6—First Office Action dated Aug. 3, 2020, 8 pages.

CN 201810380637.6—Response to First Office Action dated Aug. 3, 2020, as filed on Dec. 18, 2020, 13 pages.

prosyst.com, "The World's Smallest OSGI Solution," prosyst.com, Technical White Paper, Sep. 2010, pp. 1-3, www.prosyst.com.

EP 12731950.7—Second Office Action (Summons to Attend Oral Proceedings) dated Mar. 29, 2016, 8 pages.

EP 12731950.7—Response to Second Office Action (Summons to Attend Oral Proceedings) dated Mar. 29, 2016, Written Submissions filed Sep. 9, 2016, 18 pages.

JP 2012250247—First Office Action dated Oct. 7, 2013, 3 pages.

JP 2012250247—Response to First Office Action dated Oct. 7, 2013 filed Feb. 6, 2014, 6 pages.

JP 2012250247—Second Office Action dated Mar. 17, 2014, 4 pages.

JP 2012250247—Response to Second Office Action dated Mar. 17, 2014 filed Sep. 17, 2014, 6 pages.

JP 2012250247—Third Office Action dated Mar. 2, 2015, 3 pages.

JP 2012250247—Response to Third Office Action dated Mar. 2, 2015 filed Jul. 2, 2015, 14 pages.

(56) References Cited

OTHER PUBLICATIONS

JP 2012250247—Fourth Office Action dated Mar. 28, 2016, 8 pages.
JP 2012250247—Response to Fourth Office Action dated Mar. 28, 2016 filed Aug. 25, 2016, 11 pages.
PCT/US2006/32527—International Search Report and Written Opinion dated Sep. 24, 2007, 6 pages.
CN 200680037375.9—Second Office Action dated Dec. 22, 2011, 12 pages.
Motorola, 'Motorola's 4home Software Solutions', pp. 1-5, Feb. 11, 201, www.motorola.com/Video-Solutions/US-EN/Products-and-Services/Software/4Ho- me-Software-Solutions/4HOME-CONTROL-HOME-MANAGEMENT-US-EN.
U.S. Appl. No. 11/350,980—Notice of Allowance dated Jan. 23, 2008, 9 pages.
U.S. Appl. No. 12/210,782—Office Action dated Jan. 15, 2009, 4 pages.
U.S. Appl. No. 12/210,782—Notice of Allowance dated Jan. 29, 2009, 6 pages.
U.S. Appl. No. 12/420,723—Notice of Allowance dated Jul. 29, 2009, 13 pages.
PCT/US2006/32527—International Preliminary Report on Patentability dated Feb. 20, 2008, 4 pages.
EP 06801953—First Office Action dated Jan. 26, 2010, 8 pages.
EP 06801953—Response to First Office Action dated Jan. 26, 2010 filed Jul. 26, 2010, 36 pages.
EP 06801953—Second Office Action dated Aug. 9, 2010, 8 pages.
EP 06801953—Response to Second Office Action dated Aug. 9, 2010 filed Dec. 6, 2010, 15 pages.
EP 06801953—Third Office Action (Summons to Attend Oral Proceedings) dated Jul. 4, 2014, 6 pages.
EP 06801953—Response to Third Office Action dated Jul. 4, 2015 (Written Submissions) filed Nov. 7, 2014, 29 pages.
JP 2008-527199—Response to First Office Action dated Feb. 14, 2011 filed Aug. 15, 2011, 13 pages.
JP 2008-527199—Response to Second Office Action dated May 14, 2012 filed Nov. 16, 2012, 18 pages.
JP 2008-527199—Notice of Allowance dated Dec. 17, 2012, 3 pages.
CN 200680037375.9—First Office Action dated Sep. 2, 2010, 9 pp.
CN 200680037375.9—Response to First Office Action dated Sep. 2, 2010 filed Mar. 16, 2011, 11 pp.
CN 200680037375.9—Response to Second Office Action dated Dec. 22, 2011 filed Mar. 6, 2012, 13 pages.
CN 200680037375.9—Third Office Action dated Apr. 6, 2012, 19 pages.
CN 200680037375.9—Response to Third Office Action dated Apr. 6, 2012 filed Aug. 21, 2012, 6 pages.
CN 200680037375.9—Fourth Office Action (Rejection Decision) dated Nov. 2, 2012, 11 pages.
CN 200680037375.9—Response to Fourth Office Action dated Nov. 2, 2012 filed Feb. 4, 2013 (Request for Re-Exam), 8 pages.
CN 200680037375.9—Decision of Reexamination dated Nov. 28, 2014, 6 pages.
CN 200680037375.9—Notice of Allowance dated Jul. 3, 2015, 2 pages.
EP 12731950.7—Third Office Action (Decision Grounds) dated Nov. 18, 2016, 21 pages.
JP 2014-120922—Response to Office Action dated May 7, 2015 filed Nov. 9, 2015, 18 pages.
CN 201310699468.X—Response to Fourth Office Action (Rejection Decision) dated Sep. 2, 2016 filed Dec. 19, 2016, 18 pages.
U.S. Appl. No. 11/350,980—Supplemental Notice of Allowance dated Apr. 10, 2008, 4 pages.
U.S. Appl. No. 11/350,980—Amendment after Notice of Allowance dated Feb. 6, 2008, 8 pages.
CN 201280004517.7—Third Office Action dated Nov. 30, 2016, 16 pages.
JP 2012250247—Notice of Allowance dated Jan. 10, 2017, 2 pages.
U.S. Appl. No. 12/758,241—Office Action dated Oct. 12, 2010, 15 pages.
U.S. Appl. No. 12/758,241—Response to Office Action dated Oct. 12, 2010 filed Oct. 25, 2010, 7 pages.
U.S. Appl. No. 12/758,241—Notice of Allowance dated Nov. 8, 2010, 7 pages.
U.S. Appl. No. 12/758,236—Office Action dated Oct. 12, 2010, 15 pages.
U.S. Appl. No. 12/758,236—Response to Office Action dated Oct. 12, 2010 filed Oct. 25, 2010, 7 pages.
U.S. Appl. No. 12/758,236—Notice of Allowance dated Nov. 9, 2010, 8 pages.
U.S. Appl. No. 13/047,445—Office Action dated Oct. 12, 2012, 25 pages.
prosyst.com, "The Worid's Smallest OSGI Solution," prosyst.com, Technical White Paper, Sep. 2010, pp. 1-3, www.prosyst.com.
Santo, B., "The Evolution of Residential Gateways," Communications, Engineering and Design (CED) Magazine, May 31, 2011, pp. 1-7.
prosyst.com, "Best of Breed Home Getaway Middleware- and Beyond," Smart Home, Retrieved from the Internet: <www.prosyst.com/index.php/de/html/content/38/Smart-Home-Products/> on May 8, 2012, pp. 1-2.
prosyst.com, "We Help You Create Your Solution," www.prosyst.com, Jun. 22, 2011, pp. 1-2.
Ionics, "Ionics Stratus Plug," Retrieved from the Internet: < www ionicsplug.com/stratus.html> on Feb. 9, 2010, pp. 1-3.
EP 06801953—European Search Report dated Oct. 22, 2009, 12 pages.
Bluetooth Doc—Audio/Video Remote Control Profile, ver 1.0, May 22, 2003.
Bluetooth Network Encapsulation Protocol (BNEP) Specification, Revision 0.95a, Jun. 12, 2001, 50 pp.
JP 2008-527199—Second Office Action dated May 14, 2012, 6 pages.
JP 2008-527199—First Office Action dated Feb. 14, 2011, 10 pages.
PCT/US2012/020363—International Search Report and Written Opinion, dated Jun. 29, 2012, 40 pages.
U.S. Appl. No. 11/350,980—Office Action dated Sep. 18, 2007, 9 pages.
U.S. Appl. No. 11/350,980—Response to Office Action dated Sep. 18, 2007 filed Dec. 18, 2007, 8 pages.
U.S. Appl. No. 11/465,749—Office Action dated Sep. 18, 2007, 13 pages.
U.S. Appl. No. 11/465,749—Response to Office Action dated Sep. 18, 2007 filed Dec. 18, 2007, 13 pages.
U.S. Appl. No. 11/465,749—Final Office Action dated Jan. 24, 2008, 25 pages.
U.S. Appl. No. 11/465,749—Response to Final Office Action dated Jan. 24, 2008 filed May 23, 2008, 27 pages.
U.S. Appl. No. 11/465,749—Notice of Alllowance dated Jun. 24, 2008, 7 pages.
U.S. Appl. No. 12/210,782—Response to Office Action dated Jan. 15, 2009 filed Jan. 16, 2009, 7 pages.
U.S. Appl. No. 12/572,677—Office Action dated Nov. 13, 2009, 9 pages.
U.S. Appl. No. 12/572,677—Response to Office Action dated Nov. 13, 2009 filed Nov. 13, 2009, 10 pages.
U.S. Appl. No. 12/572,677—Notice of Allowance dated Nov. 23, 2009, 10 pages.
U.S. Appl. No. 12/572,685—Office Action dated Nov. 9, 2009, 5 pages.
U.S. Appl. No. 12/572,685—Response to Office Action dated Nov. 9, 2009 filed Nov. 12, 2009, 6 pages.
U.S. Appl. No. 12/572,685—Notice of Allowance dated Dec. 1, 2009, 10 pages.
JP 2013-548549—1st Office Action dated Nov. 25, 2013, 4 pages.
JP 2013-548549—Response to First Office Action dated Nov. 25, 2013 filed Feb. 28, 2014, 11 pages.
JP 2013-548549—Notice of Allowance dated May 13, 2014, 3 pages.
EP 12731950.7—First Office Action dated Jul. 7, 2015, 6 pages.

(56) References Cited

OTHER PUBLICATIONS

EP 12731950.7—European Search Report dated Sep. 8, 2014, 6 pages.
U.S. Appl. No. 13/344,529—Response to Final Office Action dated Feb. 4, 2015 filed Aug. 4, 2015, 14 pages.
U.S. Appl. No. 13/344,529—Office Action dated Oct. 6, 2015, 41 pages.
U.S. Appl. No. 13/344,529—Final Office Action dated Mar. 9, 2016, 30 pages.
U.S. Appl. No. 14/281,781—Office Action dated Jul. 15, 2016, 45 pages.
PCT/US2012/20363—International Preliminary Report on Patentablity dated Nov. 30, 2012, 30 pages.
JP 2014-120922—Office Action dated May 7, 2015, 9 pages.
JP 2014-120922—Notice of Allowance dated Mar. 1, 2016, 11 pages.
CN 201280004517.7—First Office Action dated Jun. 11, 2015, 21 pages.
CN 201280004517.7—Response to First Office Action dated Jun. 11, 2015 filed Dec. 28, 2015, 5 pages.
CN 201280004517.7—Second Office Action dated Apr. 15, 2016, 16 pages.
CN 201280004517.7—Response to Second Office Action dated Apr. 15, 2016 filed Aug. 30, 2016, 24 pages.
CN 201310699468.X—First Office Action dated Dec. 3, 2014, 29 pages.
CN 201310699468.X—Second Office Action dated Jul. 2, 2015, 16 pages.
CN 201310699468.X—Response to First Office Action dated Dec. 3, 2014 filed Apr. 20, 2015, 17 pages.
CN 201310699468.X—Response to Second Office Action dated Jul. 2, 2015 filed Nov. 17, 2015, 4 pages.
CN 201310699468.X—Third Office Action dated Feb. 3, 2016, 24 pages.
CN 201310699468.X—Response to Third Office Action dated Feb. 3, 2016 filed Jun. 20, 2016, 8 pages.
CN 201310699468.X—Fourth Office Action dated Sep. 2, 2016, 11 pages.
EP 12731950.7—Response to European Search Report dated Sep. 8, 2014 filed Mar. 25, 2015, 11 pages.
EP 12731950.7—Response to First Office Action dated Jul. 7, 2015 filed Dec. 30, 2015, 5 pages.
EP 17000077.2 —Oral Proceeding Minutes with Decision of Refusal dated Aug. 22, 2019, 24 pages.
CN 201310699468.X—Response to the Eighth (5th) Office Action dated Sep. 3, 2019 filed Jan. 16, 2020, 8 pages.
CN 201810380637.6—Second Office Action dated Apr. 13, 2021, 10 pages.
CN 201810380637.6—Rejection Decision dated Nov. 3, 2021, 12 pages.
JP 2020-191380—First Office Action dated Jan. 5, 2022, 16 pages.
EP 17000077.2—Response to Extended European Search Report dated Apr. 6, 2017 filed Nov. 30, 2017, 16 pages.
CN 201310699468.X—Response to Sixth Office Action (Second Board Decision) dated Oct. 27, 2017 filed on Feb. 11, 2018, 17 pages.
CN 201280004517. 7—Fifth Office Action (Board Decision) dated Jan. 29, 2018, 19 pages.
CN 201310699468.X—Reexamination Decision dated Apr. 13, 2018, 17 pages.
JP 2017-114469—First Office Action dated Aug. 7, 2018, 7 pages.
EP 17000077.2—First Office Action dated Jul. 18, 2018, 9 pages.
EP 17000077.2—Response to First Office Action dated Jul. 18, 2018 filed Nov. 20, 2018, 25 pages.
EP 06801953.8—Oral Proceeding Minutes dated Jan. 2, 2019, 2 pages.
EP 17000077.2—Second Office Action (Summons to Attend Oral Proceedings) dated Jan. 29, 2019, 11 pages.
JP 2017-114469—Response to First Office Action dated Aug. 7, 2018, as filed Feb. 4, 2019, 17 pages.
EP 17000077.2—Response to Second Office Action (Summons to Attend Oral Proceedings) dated Jan. 29, 2019: Written Submissions filed on May 31, 2019, 32 pages.
CN 201310699468.X—Seventh Office Action dated Mar. 5, 2019, 27 pages.
EP 06801953.8—Decision on Appeal dated Apr. 17, 2019, 14 pages.
JP 2017-114469—Notice of Allowance dated May 27, 2019, 11 pages.
CN 201310699468.X—Response to Seventh Office Action dated Mar. 5, 2019, as filed Jun. 25, 2019, 12 pages.
EP 17000077.2—Grounds of Appeal filed Dec. 11, 2019, 10 pages.
CN 201310699468.X—Eighth (5th) Office Action dated Sep. 3, 2019, 19 pages.
U.S. Appl. No. 13/047,445—Response to Office Action dated Oct. 10, 2012 filed Nov. 9, 2012, 7 pages.
U.S. Appl. No. 13/047,445—Notice of Allowance dated Feb. 12, 2013, 8 pages.
U.S. Appl. No. 13/047,445—Amendment After Final dated May 13, 2013, 9 pages.
U.S. Appl. No. 13/948,061—Office Action dated Dec. 27, 2013, 9 pages.
U.S. Appl. No. 13/948,061—Response to Office Action dated Dec. 27, 2013 filed Jun. 27, 2014, 7 pages.
U.S. Appl. No. 13/948,061—Notice of Allowance dated Jul. 11, 2014, 19 pages.
U.S. Appl. No. 13/345,447—Office Action dated Apr. 23, 2012, 8 pages.
U.S. Appl. No. 13/345,447—Response to Office Action dated Apr. 23, 2012 filed May 7, 2012, 7 pages.
U.S. Appl. No. 13/345,447—Notice of Allowance dated Jun. 18, 2012, 13 pages.
U.S. Appl. No. 13/345,447—Notice of Allowance dated Aug. 27, 2012, 12 pages.
U.S. Appl. No. 13/344,529—Office Action dated Jul. 2, 2014, 33 pages.
U.S. Appl. No. 13/344,529—Response to Office Action dated Jul. 2, 2014 filed Dec. 2, 2014, 10 pages.
U.S. Appl. No. 13/344,529—Final Office Action dated Feb. 4, 2015, 22 pages.
U.S. Appl. No. 13/344,529—Supplemental Response to Final Office Action dated Feb. 4, 2015 filed Sep. 11, 2015, 10 pages.
U.S. Appl. No. 13/344,529—Response to Office Action dated Oct. 6, 2015 filed Feb. 8, 2016, 18 pages.
U.S. Appl. No. 13/344,529—Response to Final Office Action dated Mar. 9, 2016 filed Sep. 8, 2016, 20 pages.
U.S. Appl. No. 13/344,529—Notice of Allowance dated Nov. 17, 2016, 18 pages.
U.S. Appl. No. 14/281,781—Response to Office Action dated Jul. 15, 2016 filed Jan. 13, 2017, 8 pages.
CN 201310699468.X—Fifth Office Action (First Board Decision) dated Mar. 29, 2017, 8 pages.
EP 17000077.2—Extended European Search Report dated Apr. 6, 2017, 10 pages.
CN 201280004517.7—Response to Third Office Action dated Nov. 30, 2016 filed Mar. 15, 2017, 28 pages.
PCT/US2012/20363—International Search Report and Written Opinion dated Jun. 29, 2012, 40 pages.
U.S. Appl. No. 11/350,980—Supplemental Response to Office Action dated Sep. 18, 2007 filed Dec. 19, 2007, 8 pages.
U.S. Appl. No. 14/281,781—Final Office Action dated Feb. 9, 2017, 35 pages.
U.S. Appl. No. 14/281,781—Response to Final Office Action dated Feb. 9, 2017 filed May 3, 2017, 16 pages.
U.S. Appl. No. 14/281,781—Office Action dated May 12, 2017, 6 pages.
CN 201310699468.X—Response to Fifth Office Action (First Board Opinion) dated Mar. 29, 2017 filed Jul. 17, 2017, 17 pages.
JP 2016-068497—Notice of Allowance dated May 16, 2017, 10 pages.
U.S. Appl. No. 14/281,781—Response to Final Office Action dated Feb. 9, 2017 and Advisory Action dated May 12, 2017, 17 pages.
CN 201280004517.7—Fourth Office Action (Board Opinion) dated Aug. 18, 2017, 10 pages.

(56) References Cited

OTHER PUBLICATIONS

U.S. Appl. No. 14/281,781—Notice of Allowance dated Sep. 5, 2017, 23 pages.
CN 201280004517.7—Response to Fourth Office Action (Board Opinion) dated Aug. 18, 2017 filed Oct. 9, 2017, 28 pages.
CN 201310699468.X—Sixth Office Action (Second Board Decision) dated Oct. 27, 2017, 10 pages.

* cited by examiner

CONSUMER ELECTRONIC REGISTRATION, CONTROL AND SUPPORT CONCIERGE DEVICE AND METHOD

RELATED APPLICATIONS

This application is a Continuation of U.S. application Ser. No. 15/864,872 filed 8 Jan. 2018, entitled "Consumer Electronic Registration, Control and Support Concierge Device and Method" now U.S. Pat. No. 10,789,244, issued 6 Oct. 2020 (NEXS 1010-16) which is a continuation of U.S. application Ser. No. 14/281,781 filed 19 May 2014, entitled "Consumer Electronic Registration, Control and Support Concierge Device and Method, now U.S. Pat. No. 9,866,697, issued 9 Jan. 2018 (NEXS 1010-10), which is a Continuation of U.S. application Ser. No. 13/344,529 filed 5 Jan. 2012, entitled "Consumer Electronic Registration, Control and Support Concierge Device and Method", now U.S. Pat. No. 9,614,964, issued 4 Apr. 2017 (NEXS 1010-5); which claims the benefit of the following provisional applications: U.S. Prov. App. No. 61/561,732 filed 18 Nov. 2011, entitled "Consumer Electronic Registration, Control and Support Concierge Device and Method" (NEXS 1010-2); U.S. Prov. App. No. 61/530,370 filed 1 Sep. 2011, entitled "Consumer Electronic Registration, Control and Support Concierge Device and Method" (NEXS 1010-1); U.S. Prov. App. No. 61/430,099 filed 5 Jan. 2011, entitled "Consumer Electronic Support Concierge Device and Method" (NEXS 1007-1); and U.S. Prov. App. No. 61/430,103 filed 5 Jan. 2011, entitled "Advertising on a Tethered Digital Butler Consumer Electronic Device and Method" (NEXS 1008-1). These priority applications are hereby incorporated by reference.

This application is related to and generally consonant with U.S. Pat. No. 8,243,886, based on application Ser. No. 13/345,447 (NEXS 1010-4) filed the same day as U.S. application Ser. No. 13/344,529.

This application is further cross-references but does not claim priority to U.S. application Ser. No. 13/047,445 filed 14 Mar. 2011, entitled "Tethered Digital Butler Consumer Electronic Remote Control Device and Method", now U.S. Pat. No. 8,494,132, issued 23 Jul. 2013 (NEXS 1000-15); which is a Continuation of U.S. application Ser. No. 12/758,241 filed on 12 Apr. 2010 entitled "Tethered Digital Butler Consumer Electronic Remote Control Device And Method", now U.S. Pat. No. 7,907,710 (NEXS 1000-13); which is in turn a Continuation of U.S. application Ser. No. 12/572,677 filed on 2 Oct. 2009, entitled "Tethered Digital Butler Consumer Electronic Remote Control Device And Method" (NEXS 1000-11), now U.S. Pat. No. 7,697,669; which is in turn a Continuation of U.S. application Ser. No. 12/420,723 filed on 8 Apr. 2009, entitled "Tethered Digital Butler Consumer Electronic Device And Method" (NEXS 1000-9), now U.S. Pat. No. 7,609,824; which is in turn a Continuation of U.S. application Ser. No. 12/210,782 filed on 15 Sep. 2008, entitled "Tethered Digital Butler Consumer Electronic Device And Method" (NEXS 1000-8), now U.S. Pat. No. 7,542,753; which is in turn a Continuation of U.S. application Ser. No. 11/465,749 filed on 18 Aug. 2006, entitled "Tethered Digital Butler Consumer Electronic Device And Method" (NEXS 1000-3), now U.S. Pat. No. 7,444,130; which is in turn a Continuation-in-Part U.S. application Ser. No. 11/350,980 filed on 8 Feb. 2006, entitled "Tethered Digital Butler Consumer Electronic Device And Method" (NEXS 1000-2), now U.S. Pat. No. 7,389,103; which claims the benefit under 35 USC 119(e) of U.S. Prov. App. No. 60/709,666 filed on 19 Aug. 2005, entitled "Tethered Digital Butler Consumer Electronic Device And Method" (NEXS 1000-1).

BACKGROUND

The field of this disclosure for selection of an Art Unit to examine this application includes systems, processes and devices for remote control, in communication with consumer devices such as lighting, entertainment appliances, heating, ventilation, air conditioning, laundry, and kitchen appliances. The systems, processes and devices communicate with cloud-based resources via a telephone line (e.g., DSL) or other two-way electromagnetic or optical transmission. One feature of some implementations is enabling conversation; another is transmission of speech or the like.

The home of the future has captured our imagination for decades and probably for centuries. For instance, Disneyland hosted a home of the future from 1957 to 1967, as a joint project of Monsanto, MIT and Disney. In that era, resources were plentiful and computers were expensive corporate devices.

Recently, IBM has published "The IBM vision of a smarter home enabled by cloud technology" (September 2010), which offers a much different vision of the home of the future, one supported by evolving cloud-based analytics. This white paper, which describes IBM's vision of a connected home and of the "Internet of things," accompanied one or more of the provisional applications and is hereby incorporated by reference.

The evolving vision of the home of the future creates an ongoing opportunity for innovation, for communication devices and home accessories that will improve our lives, control and support the interconnection of our consumer devices with services outside our homes. For some purposes, one can distinguish between consumer appliances (CA) and consumer electronics (CE), distinguishing between appliances such as dishwashers, washing machines, heaters, air conditioners, lighting and the like, versus CE television, entertainment and media center devices. New methods and devices may enhance the service experience of consumers, particularly users of leading consumer electrical and electronic devices.

SUMMARY

We disclose a concierge device that can be configured to register, control and support a consumer device. In various implementations, it alternatively or redundantly connects to a home management bridge and/or to cloud-based management servers. It can dynamically accept menus that allow a single concierge device to provide a wide range of functions customized to particular consumer devices in a home. The concierge device, when associated with a consumer device, allows the user in a single action to initiate a support call, automatically identify the consumer device, and optionally either bypass automated attendant choice trees or invoke an interactive voice response protocol or invoke a visual interaction protocol that takes into account information about the consumer device in the home. The concierge device can be configured for voice or video support calls. The concierge device in conjunction with a home management bridge or gateway can manage on boarding of components of an automated home, including home control devices and controllable devices such as switches and lamps that are connected wirelessly. Implementations of the concierge device that include a display can show supplemental information, such as advertising, optionally in coordination with media being played on a consumer device coupled in communication with the concierge device. Particular aspects of the present invention are described in the claims, specification and drawings.

BRIEF DESCRIPTION OF THE DRAWINGS

FIG. 4 depicts a concierge device built into a refrigerator or other major appliance. FIGS. 5 and 6 depict scenarios using a concierge device without a display. FIG. 7 depicts a concierge device that includes a display, in use with a home management bridge or alternatively connecting directly to cloud-based management servers. FIG. 8 depicts a concierge device with an integrated bridge and touch screen display.

In FIG. 10A, users are presented with choices, including invoking the concierge service described. FIG. 10B depicts selection of TV channels from live TV. FIGS. 11A-B depict a video phone call. FIG. 12A shows an example of user authentication using biometric data. FIG. 12B shows an example of an alert that a new home control device, a switch is available for on-boarding. FIG. 13A is an example GUI that used to select among device types to which a user can connect the new switch. FIG. 13B is an example GUI that presents devices that a user can connect to the new switch. FIG. 14A is an example of GUI from which a user can select a device and cause initiation of a support session.

FIG. 14B is an example of a suggested fix presented to a user in a support session prior to connection with a human agent. FIG. 15 depicts a video call with a human support agent.

DETAILED DESCRIPTION

Figure 1:
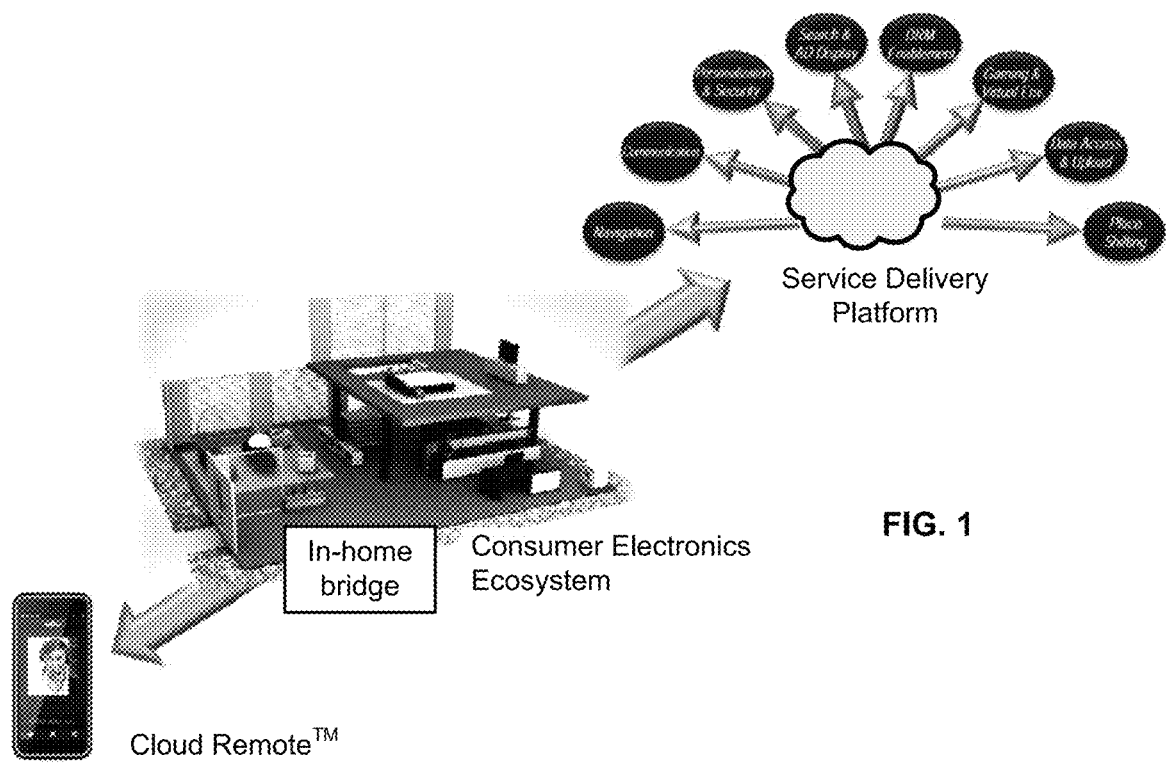
FIG. 1 is a high level conceptual diagram that includes a concierge device, a variety of consumer devices in a home, a home management bridge and a cloud-based system delivery platform connected by a network.

The following detailed description is made with reference to the figures. Preferred embodiments are described to illustrate the technology disclosed, not to limit its scope, which is defined by the claims. Those of ordinary skill in the art will recognize a variety of equivalent variations on the description that follows.

Concierge Device Range of Capabilities

We disclose a concierge device that can be configured to register, control and/or support a consumer appliance or electronics device (collectively, "consumer devices"). It is particularly innovative to register, control and/or support consumer appliance devices, as appliances have not traditionally been smart, have not been managed in the home, and have not been connected to the cloud. The concierge device, in various implementations, may connect to a home management bridge or to cloud-based management servers. In other implementations, it uses one as a back-up to the other.

In some implementations, the concierge device accepts consumer device control menus from either a home management bridge or cloud-based servers that are appropriate to a registered consumer device. These dynamically accepted menus allow a single concierge device to provide a wide range of functions customized to particular consumer devices in a home. Optional authentication security can be implemented to satisfy security conscious home owners.

The concierge device also can, in some implementations, display supplemental information to the user, such as targeted or interactive advertising.

While this disclosure refers to a home, the technology disclosed can also be applied in a business, such as a small business. Where reference is made to "in-home" technology, this translates to "on premises" for a business.

Easy On Boarding Devices to Home Automation

Easy on boarding of a new device in the home can be part of a registration process. This registration process can be made secure by authentication. Any of the concierge device, home management bridge, or cloud-based service can recognize the presence of the new device in the home network. The new device can communicate via a wireless or wired protocol as part of the home network. Optionally, the new device could communicate with the concierge device and the concierge device could relay registration communications between the new device and the bridge, the cloud based service or both.

The concierge device can participate in registration and, optionally, authentication of the new device being on boarded. A concierge device with a speaker or other audio output can receive voice prompts for confirming registration of the new device and can accept single user actions in response to the prompts, such as button presses, menu selections or verbal responses to the verbal prompts. Alternatively, a concierge device with a display can receive visual prompts for confirming registration of the new device and can accept single user actions in response to the prompts, such as button presses, menu selections or verbal responses to the visual prompts.

Authenticated On Boarding

Easy on boarding can be made secure by an authentication protocol. One authentication protocol would rely on voice prints. The concierge device preferably would relay spoken words to the in home bridge or the cloud-based service and rely on the other device to use voice printing or another biometric analysis of the voice to authorize on boarding the new device. Alternatively, the concierge device could, at a higher cost, analyze spoke words using resources built into the concierge device and perform local authentication from spoken words. Another authentication protocol would involve reading a user's fingerprint, using a fingerprint reader. The concierge device preferably would relay raw fingerprint data to the bridge or cloud based service. Alternatively, again at an increased device cost, the concierge device could locally process the fingerprint data for authentication. Other challenge and response authentication protocols could easily be implemented using the concierge device in communication with the bridge or cloud based service or using local resources of the concierge device.

Possession of the concierge device combined with an additional authentication would provide two-factor authentication.

At the simplest authentication level, the concierge device could be paired with the bridge or cloud based service and a single press of a button, shake of the device (sensed by an accelerometer, compass, gyroscope or other motion sensitive electronic, MEMS or other device) or spoken response to complete the on boarding. In this simple case, possession of the concierge device and a single user action would be enough to satisfy one factor authentication of the new device. Requiring such authentication inhibits new devices from registering themselves and becoming viruses or Trojans on a home network.

In combination with either one or two factor authentication, the bridge or cloud based service could describe the device being on boarded or added to the home network and have the user confirm that the device being added matches the description. The description could be either audio or visual. This is an additional safeguard against mistaken or malicious registration of new devices onto the network.

Among the functions that can be implemented, the concierge device may rely on either the bridge or cloud-based services to transcode media from other sources to a concierge-standard format, which reduces the complexity and cost of the concierge device. Optionally, the concierge device, when associated with a consumer device, allows the user in a single action to initiate a support call without requiring the user to look up or recall the support phone number, automatically identifying at least the consumer device and optionally the user or household. Using the automatically provided information, the concierge device, optionally, could further allow a user to bypass automated attendant choice trees, to invoke an interactive voice response protocol that takes into account information about the consumer device in the home, to invoke a session using a display of the concierge device (when it includes a display), and/or to initiate a coordinated browser-based session involving a home computer. Examples of consumer devices include televisions, stereos, A/V receivers, satellite and cable receivers, DVD players, media servers, telephone systems, dishwashers, ovens, refrigerators, other kitchen appliances, washing machines, dryers, spas, HVAC, pool equipment, lighting, security sensors, medical devices, vehicles, utilities, personal computers, and network attached appliances.

A concierge device, in some implementations, alternatively connects through redundant devices, which reduces the chance of consumer frustration with a smart home that needs to be rebooted or that has inaccessible functions, due to management device malfunctions or inaccessibility. By redundant devices, we mean a home management bridge and one or more cloud-based management servers. Examples of home management bridges include those under development (at the time of this application) by Ionics EMS and 4Home. These devices are sometimes referred to as gateways. Being cloud-based, the management servers are accessed via the Internet or another network such as a telephone, cellular, cable or fiber optic connection to a home network. By server, we mean a computing device that can be a workstation, server, server cluster, server farm or the like. The server may be an array of servers connected to a load-balancing device.

The concierge device is wirelessly coupled to the home management bridge and/or the cloud-based management servers. In some environments, it is coupled through an access point, which is connected in turn to both the Internet and an in-home network. Many other configurations are possible, consistent with this disclosure, that also afford alternative connections from the concierge device to the home management bridge and/or the cloud-based management servers.

The concierge device's first choice between alternative connections can be the in-home device, as latency on a local network should be less than latency in connecting to a cloud-based service. The in-home device can store information that the user does not want to have leave the home. The in-home device can obtain information as necessary from the cloud-based servers, connecting with them via the Internet or another network. For cloud-based services, a telecom or cable company could respond to IP messages from a concierge device without the messages ever leaving the company's network, without a hand-off from the originating network to a network owned by a second entity. Both connection via the network and a connection hosted by or affiliated with a last mile service provider are part of what we refer to as cloud-based.

Alternatively, the concierge device may first attempt to connect to the cloud-based service and then fall back to an in-home bridge as an alternative. The fall back may result from unavailability of or excessive latency in connecting to the cloud-based home management server.

The home management bridge, in one implementation, mediates registration and deployment of menus to the concierge device. The concierge device connects to the home management bridge to register an associated consumer device. The operation of the home management bridge is transparent to the concierge device. The home management bridge may already have cached or permanently installed information for the specific associated consumer device, for instance cached from the cloud. Or, it may have manufacturer connection information that allows the bridge to resolve a particular model number of the associated consumer device, register that type of device, retrieve control menus and retrieve other information. Alternatively, the bridge may rely on information initially stored by the associated consumer device. This information may be forwarded by the concierge device or obtained by the bridge directly.

In another implementation, the concierge device and associated consumer device begins by interacting with the cloud-based home management server and the role of the home management bridge is to back up information solicited by the concierge device or associated consumer device from the cloud-based home management server.

Virtual Apps—Downloaded Menus

Following registration either with, through or bypassing any in-home bridge, the concierge device receives and optionally stores menus and/or control codes for the registered consumer devices. Periodically, the concierge device may check for updated menus and/or control codes. It can check with the home management bridge or with cloud-based servers. The home management bridge may periodically refresh a cache of menus and control codes for devices registered by the concierge devices and other in-home devices that it can detect.

A concierge device can obtain from a home management bridge menu, control code and other information, even if the concierge device was not involved in registration of in-home consumer devices. For instance, a replacement or second concierge device can be reloaded by the home management bridge with information previously used by a first concierge device. Or, a first concierge device can be introduced into a home in which the bridge already had discovered consumer devices and downloaded appropriate information from cloud-based management servers.

One use of the concierge device is as a remote control. Another is to control display of information buffered by the home management bridge on a television or other available on the same network as the bridge. A further use of the concierge device is to provide support for the consumer device.

Concierge Device for One Action Support

Four levels of support automation are described. At the basic level, the concierge device provides telephone support, following automatic identification of user/household and/or consumer device to the support center by either the concierge device or a home management bridge.

At the next level, the concierge device includes a camera that provides still or video information to a support center during the support call. Optionally, a personal computer, television or other device with a display can receive visual information to assist the user during the support call. The visual information may be an image of the support person, pictures illustrating aspects of the consumer device, textual instructions or a combination thereof.

Automated troubleshooting can be pursued before a user is connected with a human support agent, using either a visual based interaction or an interactive voice system. The automated trouble shooting may require mandatory responses from the user, or it may be optional: opt in by asking a user if they want to try automated trouble shooting; opt out by starting the automated protocol and giving the user the option to proceed to human support without further automated support; or opt in combined with opt out. Alternatively, the automated troubleshooting may happen while waiting in queue to be connected to a human support agent. The troubleshooting may involve a traditional interactive voice response system, a browser-based visual troubleshooting protocol, or an advanced interactive system based on the Watson artificial intelligence technology demonstrated by IBM. Trying the automated trouble shooting may be optional during the queue period. A support system may be configured to allow a user to postpone human support, if automated support seems to be working, either by using the support interface or by telling the human support agent to come back later. A user whose turn to talk to a human support agent comes up in queue while pursuing automated trouble shooting may be kept at the top of the queue, so that they receive assistance promptly after completing automated trouble shooting, to improve user reception of the automated trouble shooting option.

Instead of performing automated trouble shooting with a display, an automated voice response (AVR) system could be used to collect information and lead the user through basic troubleshooting steps. Much of what can be done with a display could, alternatively, be done using voice interactions with an automated system.

At the third level, the concierge device causes diagnostic status information to be forwarded from the consumer device to the support center. This level optionally includes the camera of the previous level. Alternatively, configuration of the concierge device with the consumer device and the home management bridge may enable the consumer device periodically or occasionally to provide status and/or diagnostic information to a support center, without the need for the user to initiate a support call. Then, when the user initiates a support call, the support center may already have the information needed to identify problems with the consumer device, not necessarily limited to the problem that leads to the support call. Optionally, automated troubleshooting, described above, also can be pursued before a user is connected with a human support agent. The availability of this feature and option, of course, depends on the status of the consumer device. The device may be dead, diagnostically accessible, or working and diagnostically accessible. By "dead," we mean that there is no electronic communication with the consumer device, either directly or indirectly. By diagnostically accessible, we mean that the concierge device or a bridge working with the concierge device is able to communicate with the consumer device, at least for diagnostic purposes. This may involve a special mode, such as the "safe boot mode" on a personal computer. By working and diagnostically accessible, we mean that the consumer device is largely functional, but requires support. The diagnostic information forwarded may include one or more status codes. It may include software/firmware version information and component inspection results.

At the fourth level, the concierge device or a bridge working with the concierge device relays communications between the consumer device and the support center in a diagnostic session. This level optionally includes features of the prior levels and nicely builds upon them. The diagnostic session may involve the support center triggering a self-diagnostic routine or selective retrieval of information helpful to diagnostics, such as a history of status/error codes or operating status, configuration information, or a dump created when the consumer device malfunctioned. It also may involve sending information from the support center to the consumer device, such as new firmware, revised configuration data or reset commands. The stream of communication or diagnostic session status information optionally may be displayed or summarized for the user to monitor on a personal computer, television or other device with the display. Even before a human support agent becomes involved, an automated support protocol could, optionally, be used to engage the user in the communications between the consumer device and the support center diagnostics. A system could automate such routine tasks as obtaining the user's permission to engage in interactive diagnostics, obtaining user visual observations of the device, identifying procedures that the user already has followed, obtaining user contact and/or registration information. A wide range of information collection and diagnostics could be automated, not limited to these examples.

The simplest concierge device lacks a display or includes a minimal monochrome display. It need only have a microphone, speaker, one to a few function buttons or input sensors, a memory and at least one wireless transceiver. The simple concierge device could rely on a bridge to transcode voice communications and, optionally, pictures. It also relies on the bridge to maintain communications with the support center during the support call. In operation, the simple concierge device is associated with the consumer device and then the user initiates the support call for the associated consumer device with a single action. For instance, the user could press a support button or utter a command that the concierge device or the bridge would interpret. Then, the user proceeds with the support call.

The bridge can communicate directly with the Internet or a private network or may be attached through a router, bridge or other network device. The bridge may include router and/or modem functionality, as is found among cable and DSL modems. Preferably, malfunctioning of the home management bridge will not interfere with connection to the Internet or a private network.

The concierge device, even in its simplest configuration, can support multiple devices and/or multiple brands of devices. Given the functionality and alternative protocols disclosed, almost any configuration of concierge device could be used with a TV from one manufacturer, a DVR from another, and a washing machine from a third manufacturer. The one exception might be a crippled configuration shipped with a device and purposely limited to a single device or single manufacturer.

Associating (Linking) the Concierge Device and Consumer Devices

There are a variety of options for associating the simple concierge device with a particular consumer device for support calls. One association model is the familiar Bluetooth pairing model, in which the consumer appliance or electronic device and simple concierge device are placed in pairing mode and allowed to pair. Information is transferred from the consumer device to the concierge device during or following the pairing. Another option is for the in home bridge to discover consumer devices and for the concierge device to pair with the bridge, without having to pair with any of the consumer devices. In some implementations, a consumer may find it more convenient to pair just once with a bridge than to pair repeatedly with a wide variety of devices. Pairing with just one bridge would save the consumer from recognizing slight variations on pairing protocols that would inevitably follow from pairing with devices of all sizes, shapes and origins.

Information provided by the consumer device to the concierge device or bridge may be as simple as a serial number or it may include further information that identifies the device manufacturer and model number. Alternative identifiers may be globally unique user identifiers (GUIDs) or identifiers that are unique within a realm, such as unique to a manufacturer or a trade group. Optionally, it may identify the device category and/or family so that appropriate support staff can be reached, even if the precise model number is not in a support database. The consumer device may have embedded a unique resource identifier (URI), such as a universal resource locator (URL), with or without additional parameters, that identifies or allows lookup of the support center, as an alternative to identifying the manufacturer and model. Pre-installation inventory of control and/or controllable device components can be accomplished using camera or bar code reader to read a bar code or similar label. Or, an RFID reader can be used to read a tag. Optionally, a digital floor plan could be used to ease the burden of commissioning or on boarding of devices.

Another association model uses the home management bridge to associate the concierge device with the particular consumer device that needs support. The home management bridge can be used to register one or more consumer devices with at least one support center. The bridge and the simple concierge device are paired or at least coupled in communication. The user interacts with the bridge to select the particular consumer device that needs service. Then, a single action at the concierge device or bridge initiates the support call. The concierge device participates in a support session at one of the support levels described above.

A third association model programs the concierge device with the consumer device information without requiring direct communication with the particular consumer device by either the home management bridge or the concierge device. For instance, the concierge device can be preprogrammed at the factory. Or, it can be programmed using the bridge or any personal computer, television or other device with the display. For instance, it could be coupled using a wired USB connection or a wireless Bluetooth connection to a personal computer, television or DVD player that runs a small application which loads the consumer device information into the concierge device.

Of course, other association models could be used and remain consistent with the teachings of this disclosure.

Example of Support Session Implementation

At the outset of the support session, the bridge sends the support center at least consumer device information and, preferably, user identification information. The user identification information can be as simple as a globally unique identifier (GUID) of the concierge device, home management bridge or consumer. For the concierge device and home management bridge, a MAC address may serve as a GUID. This GUID may be registered with the support center before the support call or registration information may be collected during the support call. Preferably, the user's name would be associated with the GUID. The user identification information may be household related, individual related, or both. Either a household or individual can have more than one concierge device. Information about the consumer device or a plurality of consumer devices may be implied in the GUID. Optionally, the GUID, the particular consumer device identification or a combination of the GUID and consumer device identification can be associated with a premium support level, such as contract support or extended support. Premium support association entitles the support call to special handling, such as a shorter wait queue or different support personnel.

A display equipped concierge device adds a display to the simple concierge device. The display equipped concierge device can have navigation controls or a touch sensitive screen. It can have a keyboard implemented with buttons or on-screen. The display equipped concierge device can interact with the bridge and the support center without involvement of a personal computer television. The display equipped concierge device can be used to register the consumer devices with the support center or to enter information that will be useful at the outset of the support call. It also can be used to answer diagnostic questions at the beginning of the support session, before a support person comes on the phone. The diagnostic questions may depend on the consumer device information supplied to the support center.

The display equipped concierge device can rely on the home management bridge for services including transcoding voice communications and, optionally, pictures and maintaining communications with the support center.

Another hardware configuration includes the concierge device with integrated bridge. For instance, the concierge device may be a smart phone that runs a concierge application. If the consumer already owns an Android phone, an iPhone, an iPad or other portable device that includes wireless communication, a concierge application may be a low cost implementation of the concierge device. The service levels and association models described above still apply to concierge device with integrated bridge.

In yet another configuration, the concierge device is built into the consumer device, in the sense that the speaker and microphone are built into a major appliance, apropos to Internet surfing on a refrigerator door. In this configuration, the bridge could be built into the major appliance (integrated bridge) or it could be a separate device coupled wirelessly or by powerline connection to the major appliance.

The home management bridge, again, optionally transcodes voice communications and, as a further option, pictures. The bridge establishes and maintains communications with the support center during the support call. It includes in the data stream with the support center identification information and, optionally, diagnostic information, consistent with the four service levels identified above or variations on those service levels.

DESCRIPTION OF FIGURES

FIG. 1 is a high level conceptual diagram that includes a concierge device, labeled Cloud Remote™, a home management bridge, a variety of consumer devices in a home and a service delivery platform connected by a network to the home. The service delivery platform can provide functionality such as navigation, communication, personalization security, search and ad display, digital rights management, gaming and virtual entertainment, data access and upload and place shift. The service delivery platform provides cloud-based management servers. While there is a significant list of functions in this figure, many additional functions could be supplied upon connecting a consumer device through the technology disclosed to services accessible via a network.

Figure 2:
FIG. 2 depicts a concierge device in a variety of form factors.

The concierge device may take on a variety of form factors as depicted in FIG. 2. In FIG. 2, from left to right, we see a wand, which includes one or more function buttons, a speaker and microphone. With voice activation, even the button might be eliminated, in favor of a microphone and speaker. The device could turn on with motion sensing instead of button activation, utilizing an electronic or MEMS sensor of motion or orientation such as an accelerometer, inclinometer, compass or gyroscope. In the middle is a simple concierge device with a thumb board and navigation controls. To the right is a concierge device with a touch screen. The concierge device can take on any of these form factors. Some of the scenarios described in this disclosure vary, depending on whether the form factor of the concierge device includes a display or not.

Figure 3:
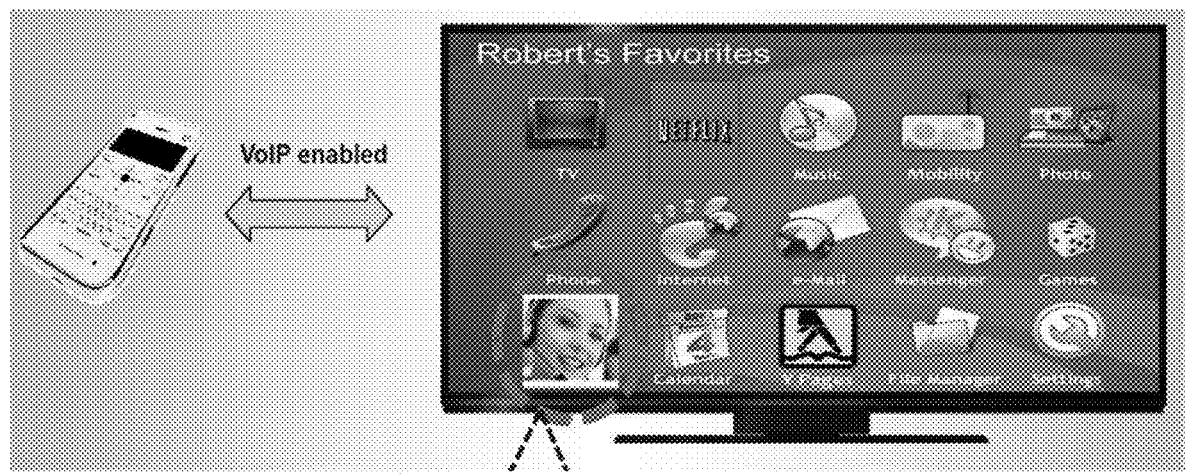
FIG. 3 depicts telephone and support service as functions that might be selected using a concierge device.

FIG. 3. depicts telephone and support service as functions that might be selected using a concierge device. A dedicated button on the concierge device might select a support call or navigation keys on the concierge device might be used with a single click to initiate a support call or session.

Figure 4:
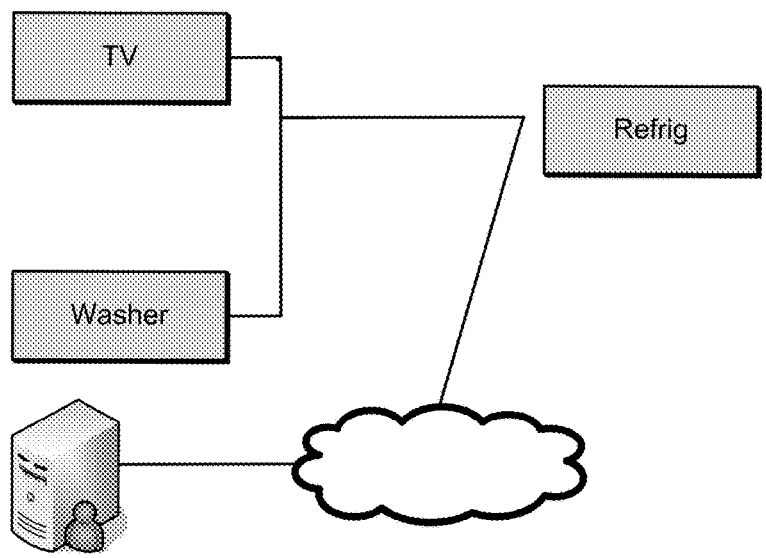
FIGS. 4-8 show configurations of concierge device and home management bridge, either integrated or standalone.
Figure 6:
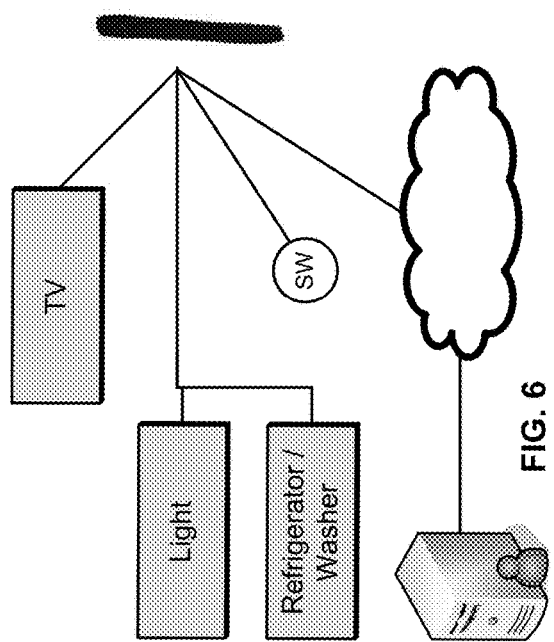
Figure 5:
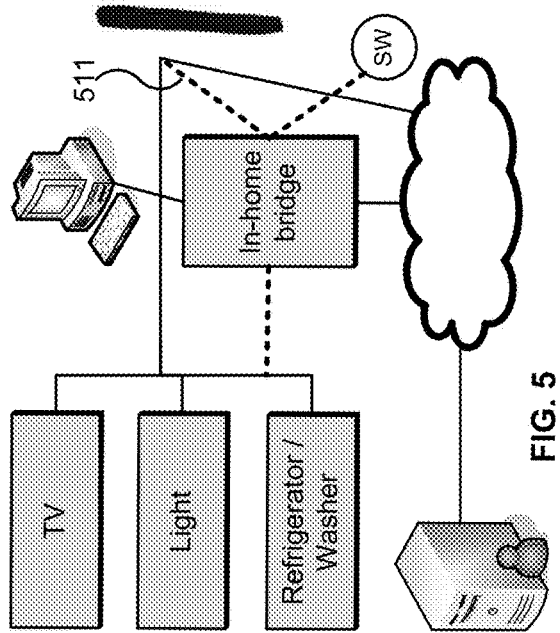

FIGS. 4-8 show configurations of concierge device and bridge, either integrated or standalone. FIGS. 5 and 6 depict scenarios using a concierge device without a display. In these scenarios, AVR automated troubleshooting could be made available, in any of the modes described above. In FIG. 5, the concierge device can be associated directly with one of the consumer devices, such as a TV, light, refrigerator or washer or coupled to the consumer devices through the bridge. A computer, TV or other monitor can be used to confirm actions performed using the concierge device or for configuration of the concierge device. Any of these monitors can be used for visually based automated trouble shooting, as described above. Alternatively, verbal commands and confirmations could be exchanged between the concierge device and the home management bridge. Upon request, the bridge can initiate a phone call, using the concierge device as a handset. This support session will typically be handled via VoIP through the Internet to a support server. Alternatively, cloud-based management servers coupled in communication with the concierge device could be used to initiate the phone call.

Optionally, the concierge device may communicate with the in-home bridge via 511 through a built in or separate access point or through an in home network. The concierge device can rely on the in-home bridge to relay its messages to other devices or to process its messages directly. In this scenario, a home management bridge handles communications between the concierge device and consumer devices. In some implementations, the home management bridge also forwards signals from home control devices such as a wireless switch (SW) to controllable devices, such as the TV, light, refrigerator or washer. The functions of such home control devices may be replicated on the concierge device, especially when the device has a display, as in FIGS. 7-8.

In FIG. 6, the bridge is built into the television. Given the functionality included in televisions, the bridge described in this disclosure could readily be incorporated into a TV. Many TVs already are capable of communication through the Internet to a server. Alternatively, the bridge could be built into the concierge device and the TV used merely as a monitor to confirm actions being taken by the concierge device.

Figure 7:
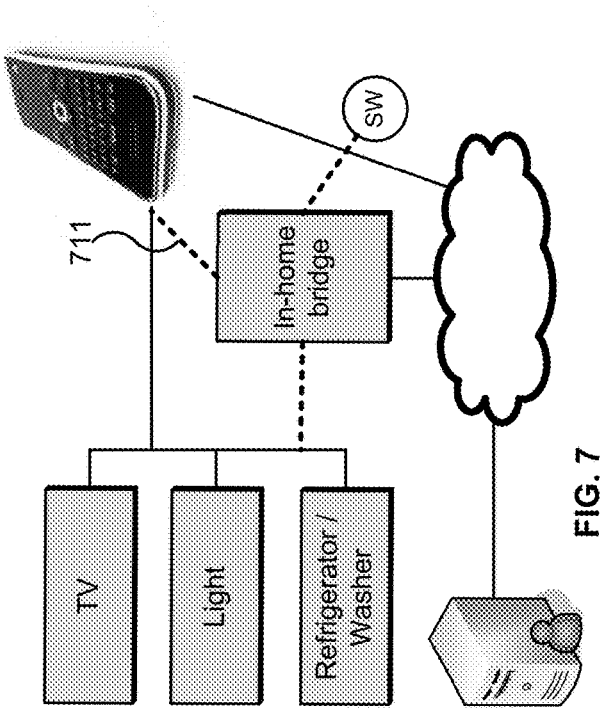

FIG. 7 depicts a concierge device that includes a display, in use with a home management bridge that is a separate and distinct physical device. Because this concierge device includes a display, it is unnecessary to use a personal computer or television to confirm actions being taken. Optionally, the concierge device may communicate with the in-home bridge via 711 through a built in or separate access point and rely on the in-home bridge to relay its messages to other devices or process its messages directly.

Figure 8:
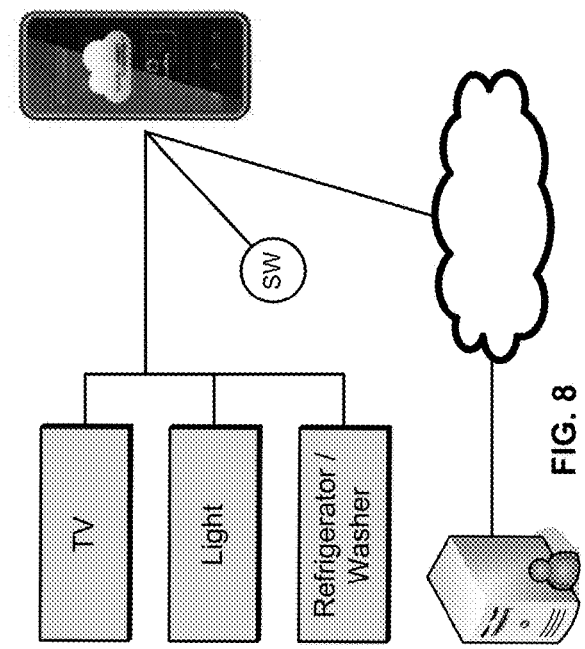

FIG. 8 depicts a concierge device with an integrated bridge and display. In this figure, a touch screen device is depicted. The concierge device may be implemented in this configuration as an application running on a smart phone, tablet or similar device.

FIG. 4 depicts a concierge device built into a refrigerator or other major appliance. In this illustration, the bridge would be built into the refrigerator as well as the concierge device. Alternatively, as depicted in FIGS. 5-6, the bridge could be a standalone device or built into a TV or signal source for a TV, such as an A/V receiver, a DVD, cable or satellite box.

Figure 9:
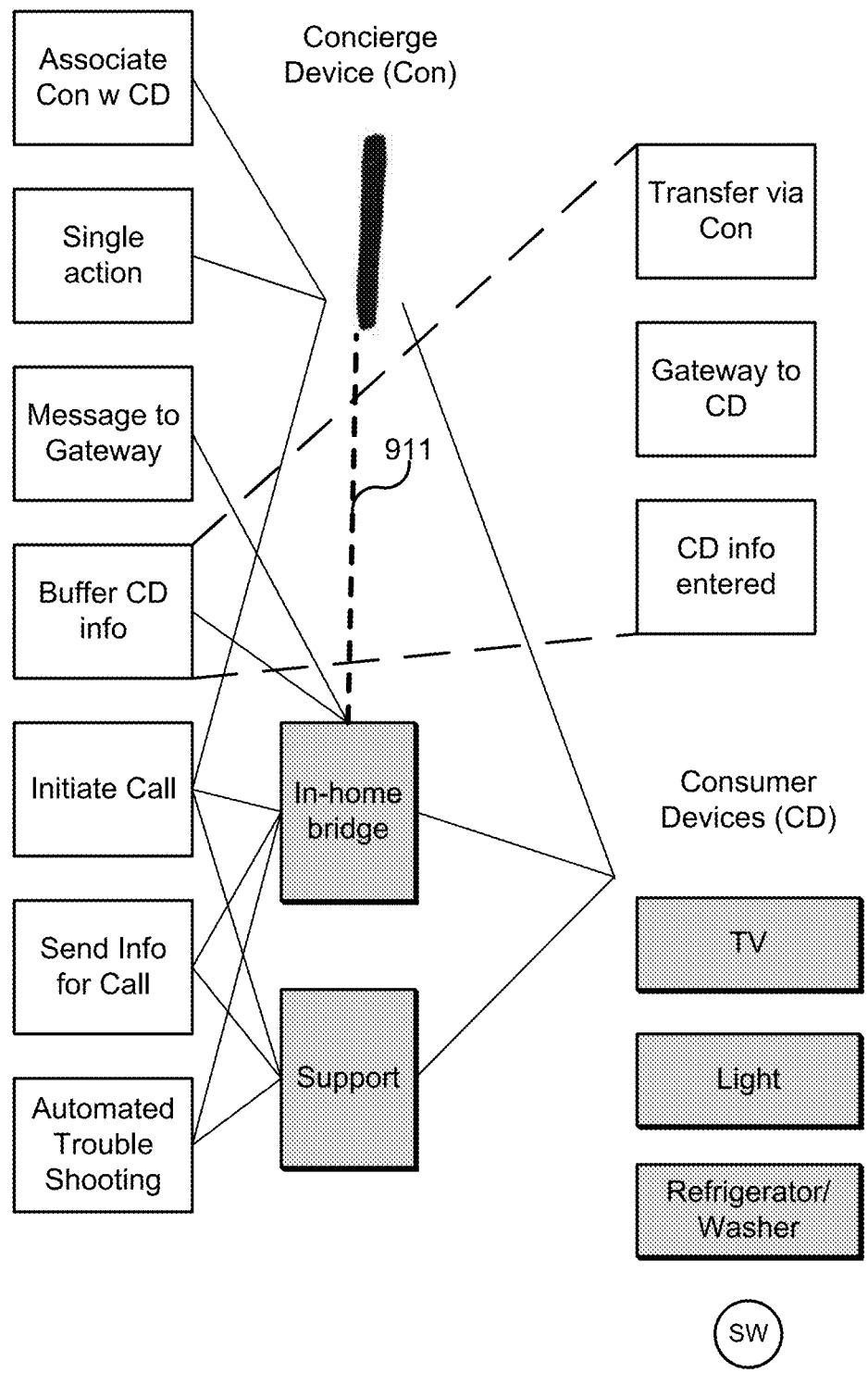
FIG. 9 is a flowchart of methods consistent with this disclosure.

FIG. 9 is a flowchart of methods consistent with this disclosure. In the left column are a series of actions. First, the concierge device is associated with the consumer device. Several ways of handling this association are described in the body and claims of this document. A single action using the concierge device initiates the support activities that follow. The single action could be a button press, a single or double tap of a pad, a wave of the device or spoken word(s). Responsive to the single action, the concierge device causes a message to be sent to the bridge. The bridge buffers consumer device information for use in a support call and then initiates the call, responsive to the single action. The bridge sends information to the support center in support of the call. The information may be used to bypass automated response trees and menus, to personalize the user experience. The information optionally may be used to offer or initiate automated troubleshooting, as described above. The bridge also may send consumer device status information in aid of troubleshooting or, in some cases, even bridge a diagnostic session between a support server and the consumer device being supported. In the right-hand column of FIG. 9, we see alternative ways in which consumer electronic information can be buffered to the bridge. It could be transferred via the concierge device. The bridge could communicate directly with the consumer device. Or, the consumer device information could be entered using any general data entry method, such as a keyboard or voice recognition. Optionally, the concierge device may communicate with the in-home bridge via 911 through a built in or separate access point and rely on the in-home bridge to communicate relay its messages to other devices or process its messages directly.

Figure 17:
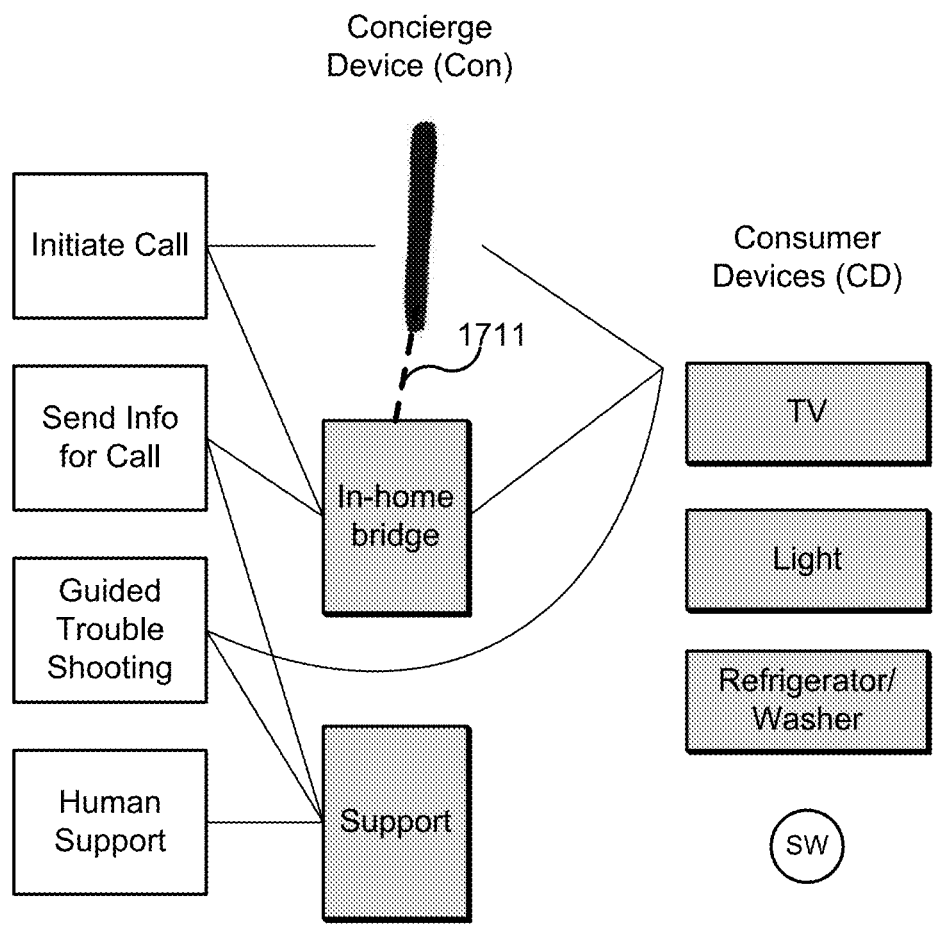
FIG. 17 is a high level diagram of adding to support an automated interaction for the user.

FIG. 17 is a high level diagram of adding to support an automated interaction for the user. Building on FIG. 9, this figure illustrates using the information sent to support to generate or select a relevant automated interaction. For instance, the system sends the user a document for display with troubleshooting hints and directions. The interaction may be optional, as some users may prefer guided trouble shooting to talking with a support person. Or, an automated protocol may be a required preliminary that addresses frequently encountered issues. More alternative modes of automated or guided trouble shooting are given above. Optionally, the concierge device may communicate with the in-home bridge via 1711 through a built in or separate access point and rely on the in-home bridge to communicate relay its messages to other devices or process its messages directly.

Figure 18:
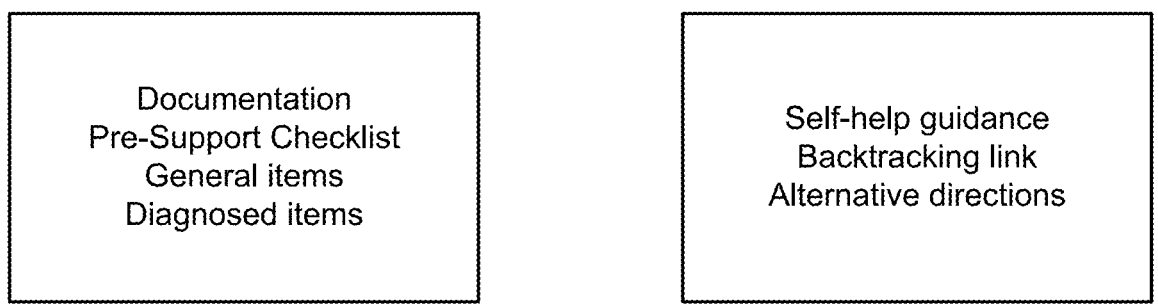
FIG. 18 represents a sample of information that may be supplied as part of an automated interaction.

FIG. 18 represents a sample of information that may be supplied as part of an automated interaction. For instance, a variety of documentation such as manuals, data sheets, part lists and feature guides can be available. Pre-support checklists can be provided to cover steps such as checking the power and rebooting the device. Support can be provided in response to general questions from a user. Alternatively, support can be provided for diagnosed faults. These faults may be reported with status or configuration data or diagnosed using status and configuration data. The data available from the consumer device can be combined with user responses to focus the investigation. Self-help guidance can be provided for those interested.

Figure 10A:
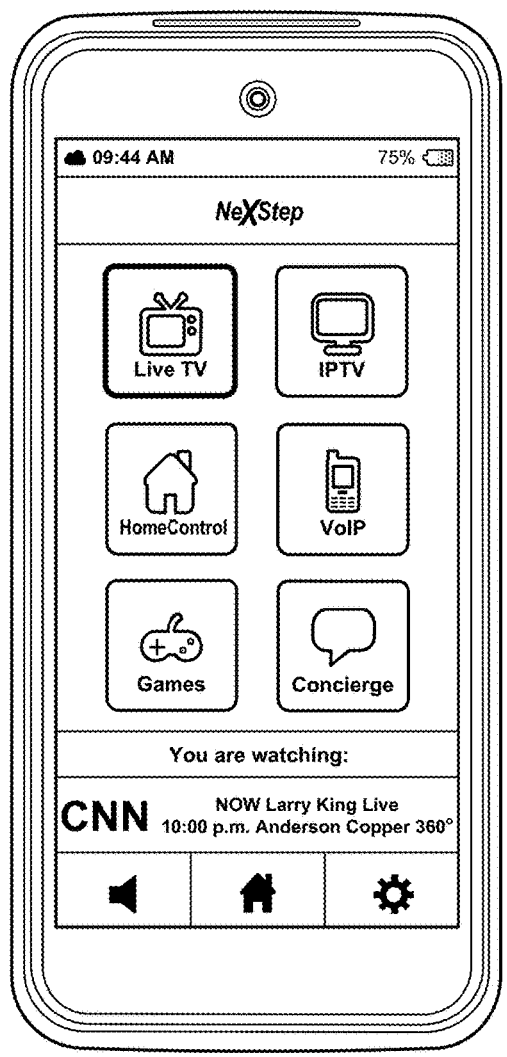
FIGS. 10A, 10B, 11A, 11B, 12A, 12B, 13A, 13B, 14A, 14B and 15 are example screens for a concierge device that includes a display.

FIGS. 10A, 10B, 11A, 11B, 12A, 12B, 13A, 13B, 14A, 14B and 15 are exemplary screens for a concierge device that includes a display. In FIG. 10A users are presented with choices, including invoking a concierge service to initiate a support call. Users are presented with choices of watching live TV or IP TV, controlling consumer devices within the home, initiating a VoIP call, playing games or invoking the concierge service to initiate a support session.

Figure 10B:
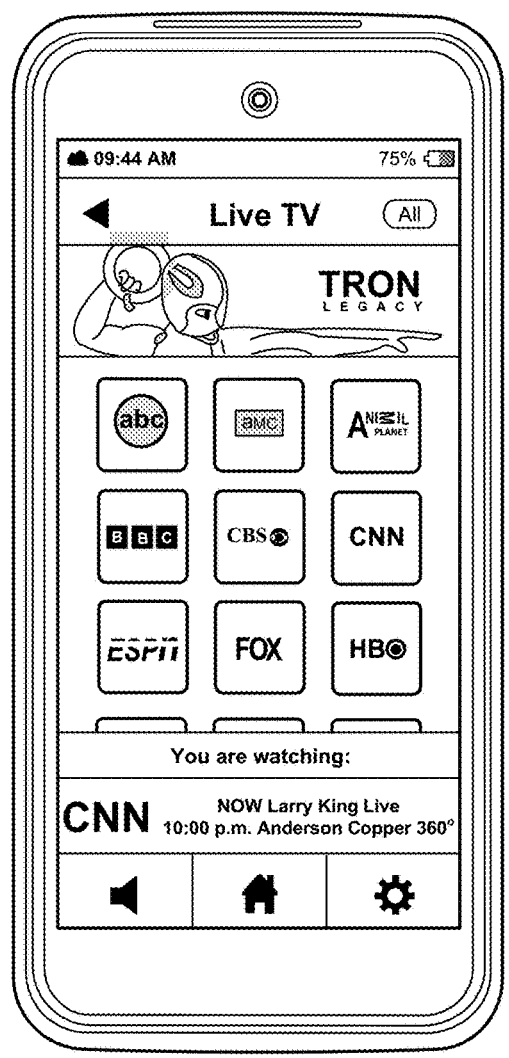

FIG. 10B depicts selection of TV channels from live TV. Customizable buttons can be provided and a user's favorite channels featured.

Figure 11A:
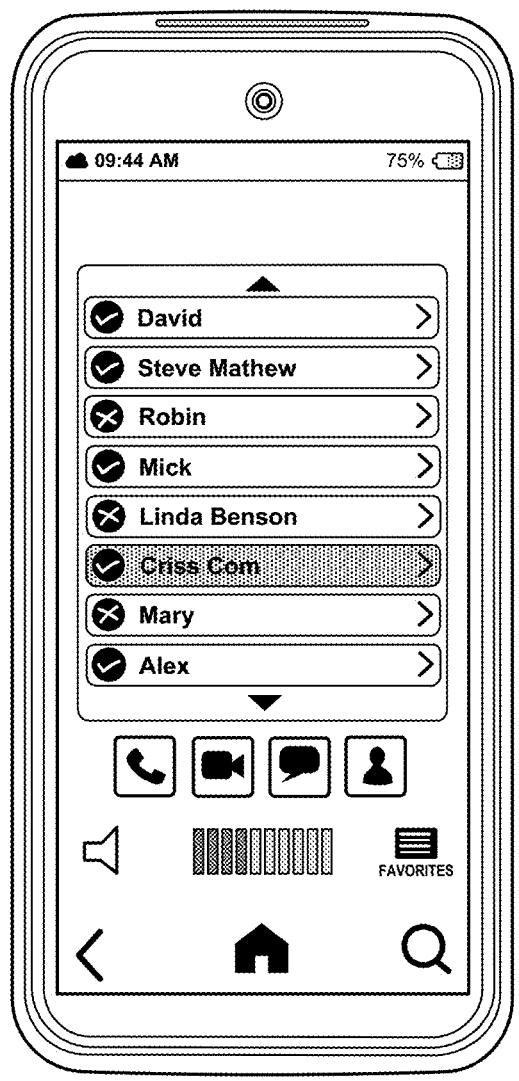
Figure 11B:
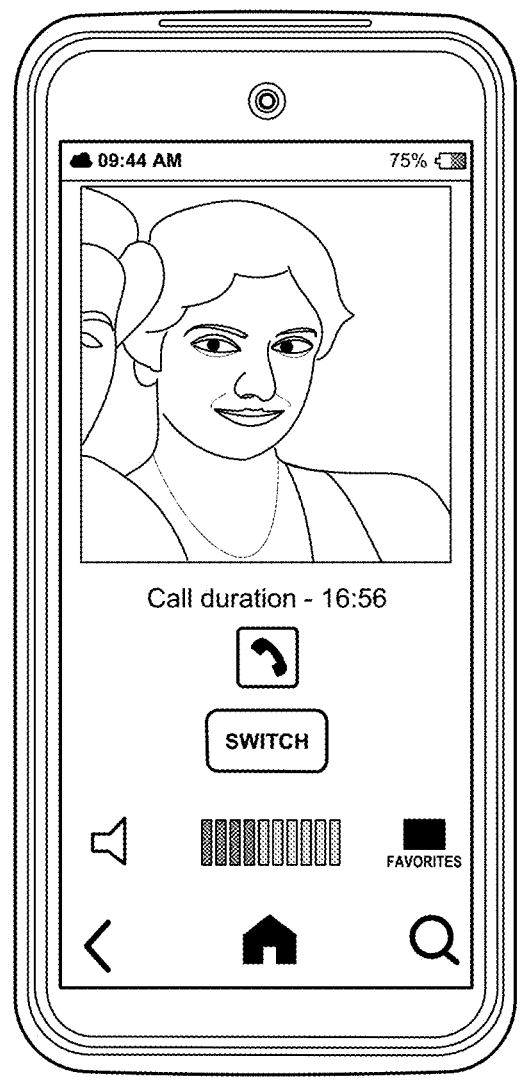

FIGS. 11A-B depict a video phone call. FIG. 11A is an example of a contacts list used to initiate calls. FIG. 11B is an example of a video phone call in progress.

Figure 12A:
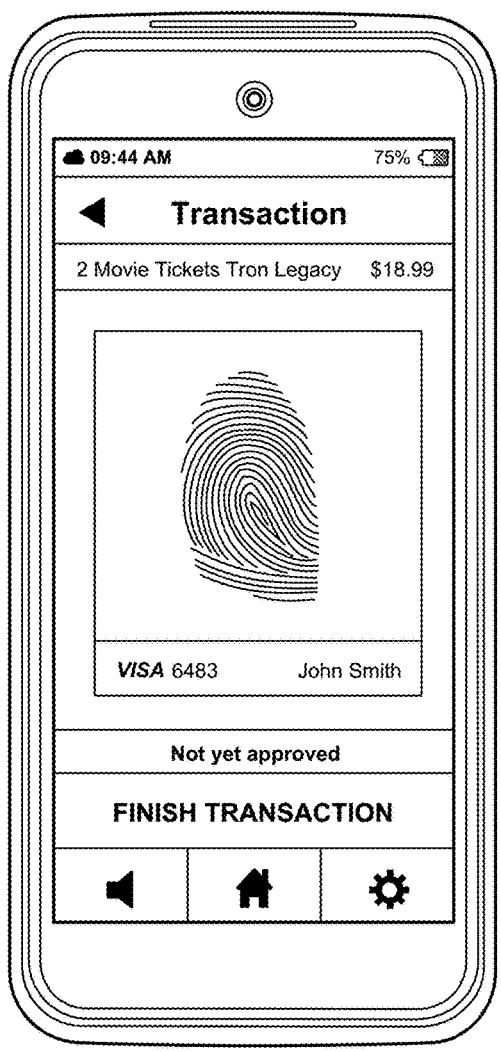

FIG. 12A shows an example of user authentication using biometric data. In this example, use of a fingerprint for authentication is illustrated. Voice prints or facial recognition also can be implemented on a concierge device, as can many forms of challenge and response.

Figure 12B:
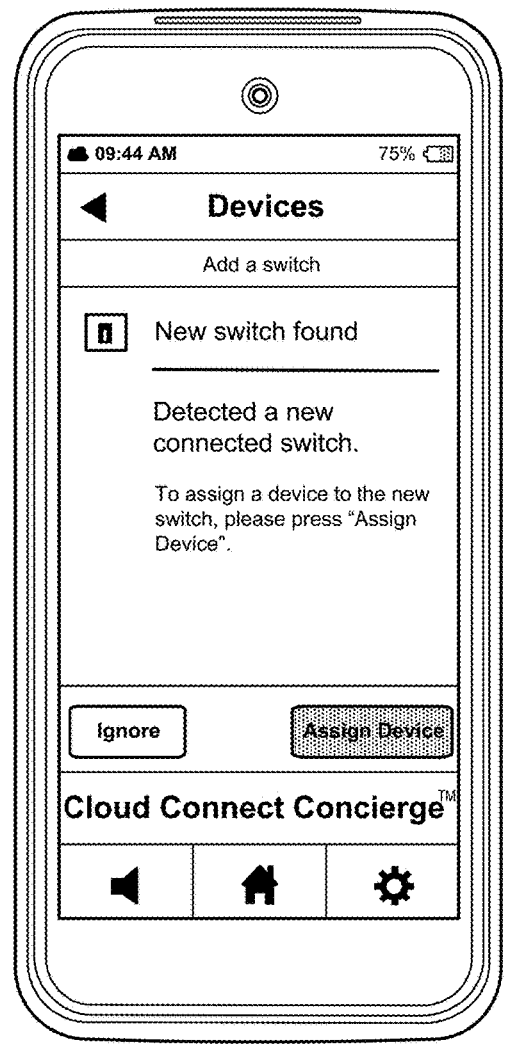

FIG. 12B shows an example of an alert that a new home control device, a switch is available for on-boarding. The home management bridge monitors the availability of new devices for on boarding. It can listen continuously for new signals or can be placed in a listening, pairing or enrollment mode when a new device is to be added. The concierge device receive alerts from the bridge and alerts the user by visual, audible or tactile cues.

Figure 13A:
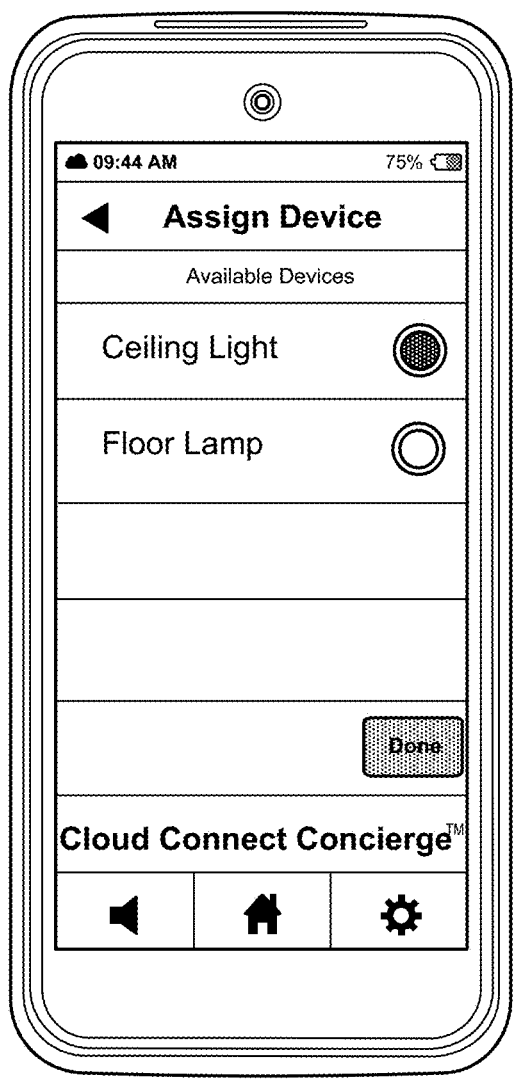

FIG. 13A is an example GUI that presents devices that a user can connect to the new switch.

Figure 13B:
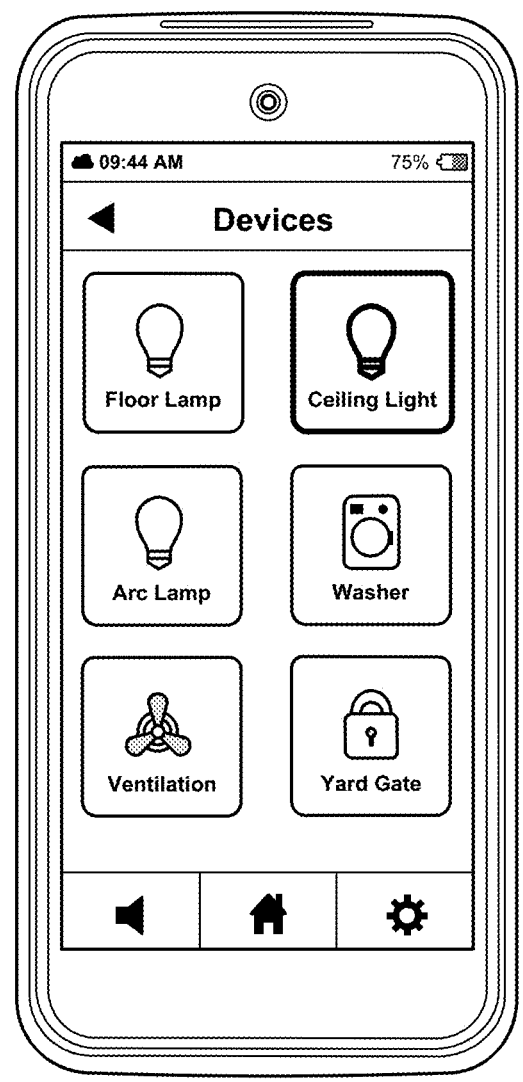

FIG. 13B is an example GUI that used to select a device to control. When a device is selected, another screen may appear that provides access to controls beyond a simple toggle.

Figure 14A:
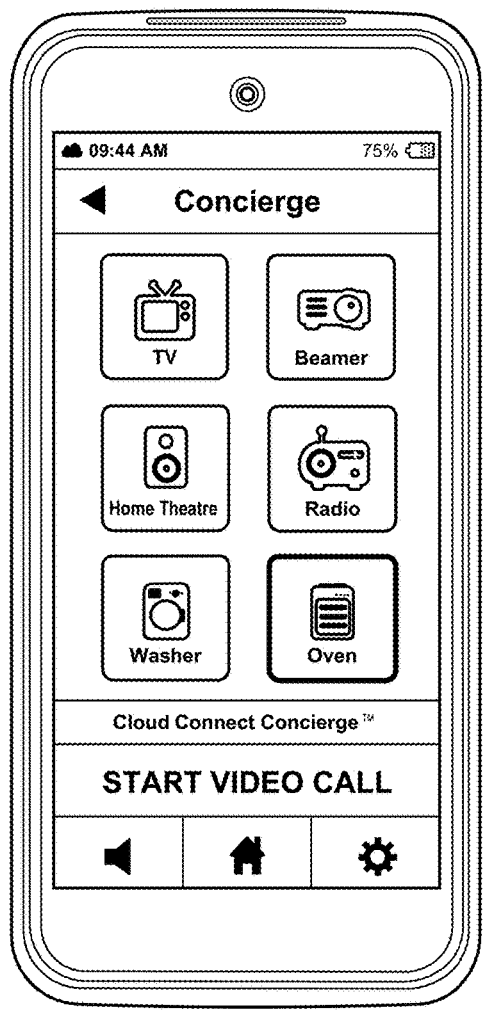

FIG. 14A is an example of GUI from which a user can select a device and cause initiation of a support session. The devices illustrated as having available concierge support include a TV, projector, home theater, radio, washer and oven. As easy as identifying devices for remote control, the concierge panel allows a user to select a device and cause initiation of a support telephone call. The call may be a video call or audio-only. The system may automatically select the best communications available. A video call may include pictures from a front facing camera, directed towards the user, a back facing camera directed to the device that is being serviced or some combination of the two. The information displayed from the support center may be directions, photographs of what to look for, or the support person. As illustrated in other figures, interaction with a human support agent may be preceded by an automatic support protocol, optionally with diagnostic responses by the consumer device to queries received at the outset of a support session.

Figure 14B:
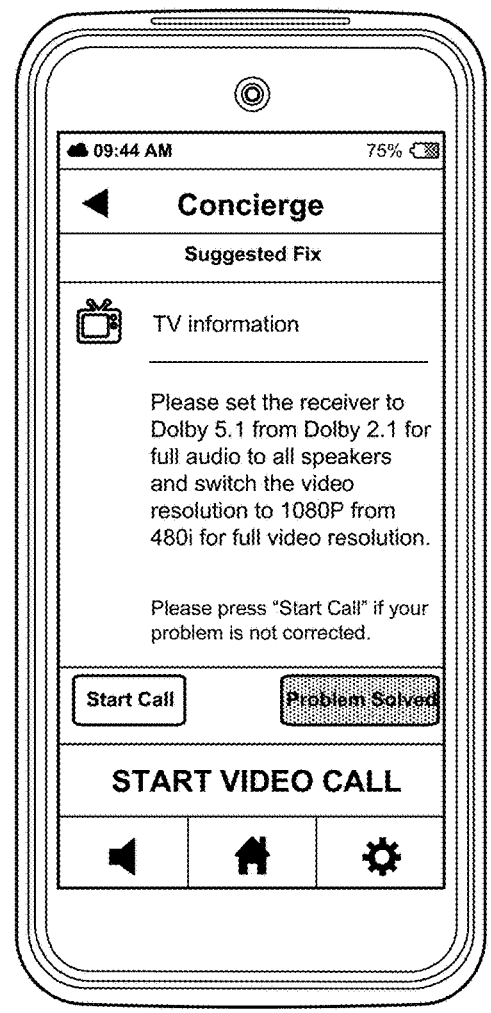

FIG. 14B is an example of a suggested fix presented to a user in a support session prior to connection with a human agent. The session example involves a television. Status information and, optionally, diagnostic responses to queries have been provided digitally to the support session. An automated support protocol has been invoked to suggest possible resolutions of the user's problems. The problems resolved may be suggested by the user, the support servers or both. For instance, in this example, the user might only have mentioned a video resolution problem. Upon detecting a similar audio resolution problem the suggested fix can be extended from the first problem that the user presented to another, related problem. The user has the option of moving forward with human agent contact by pressing the "start call" button.

Figure 15:

FIG. 15 depicts a video call with a human support agent.

Figure 16:
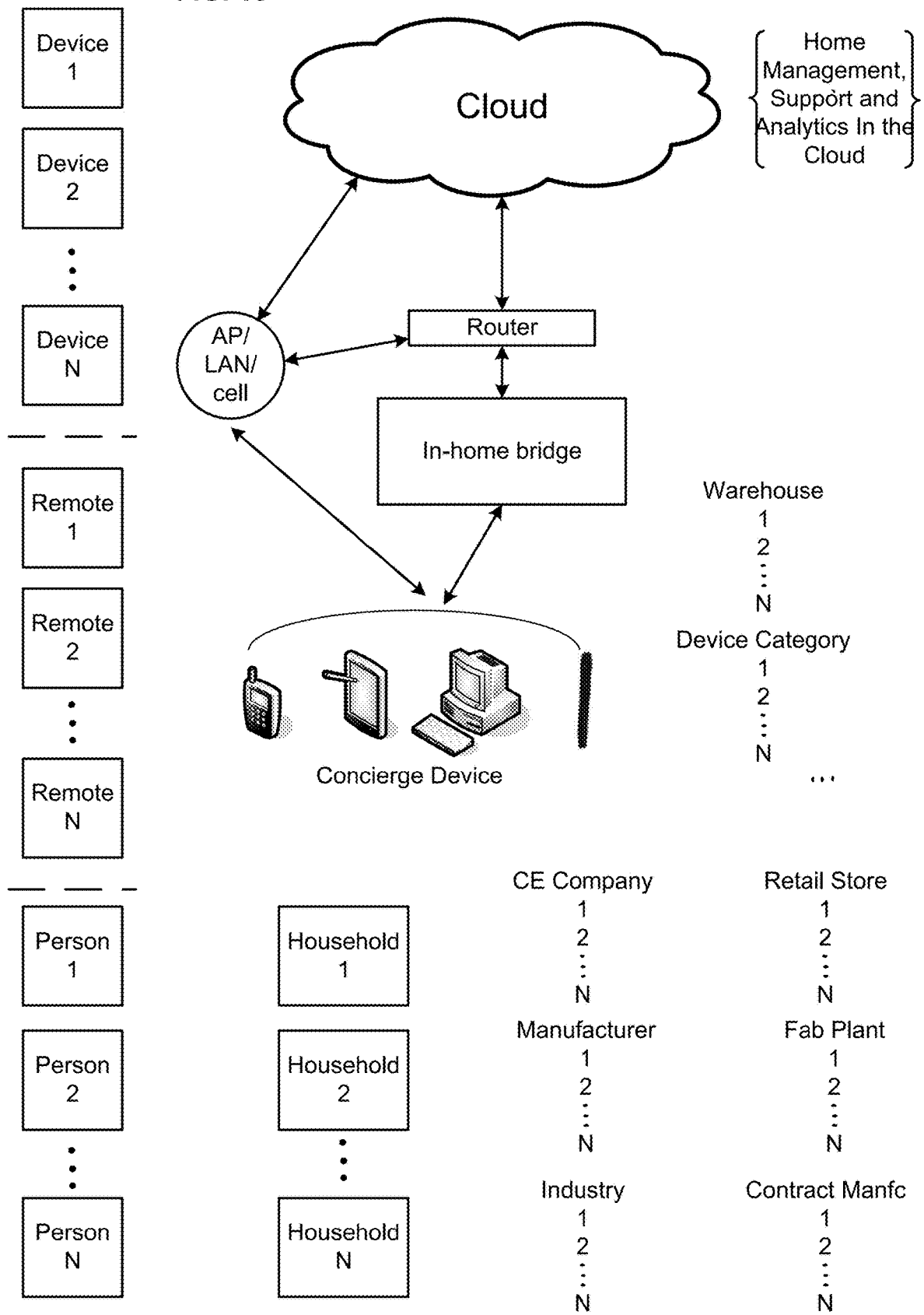
FIG. 16 depicts information that may be useful for the home management bridge or the concierge device to communicate to the support center.

FIG. 16 depicts types of information that may be useful to the support center. In a home, devices 1 through N may be present. Controls 1 through N may correspond to individual devices or persons within the home. They may be linked through the bridge or directly to the Internet. The form factors for the concierge device may include any of the form factors in FIG. 2, or built into a major appliance, or as an application running on a smart device such as a tablet or smart phone. Alternatively, a programmable face plate or remote could be mounted on a switch box, cradled in a charger or surface mounted on the wall. May be portable, especially from the charger. A screen saver of this remote could be a dimmer control. A home computer could also be used as a remote device, although the range of communications via Bluetooth or Zigbee may be more difficult to accomplish between a stationary computer and a consumer device.

In the left-hand column, any number of persons may be located in the same household as the consumer electronic and concierge devices.

More generally, the support service needs to handle multiple households. Consumer electronic information that may be of interest for service purposes includes the company that marketed the device, the manufacturer of the device, or the industry supported. For an individual device, the warehouse that shipped the device and the device category may be of interest, as may be the retail store that sold it, and either the fabrication plant or contract manufacturer that produced the device. In a full implementation, analytics hosted at a support center accessed via the Internet or so-called cloud helps the support staff quickly diagnose the problem being encountered. These analytics may take advantage of information about the device manufacturing, but beyond the information that the consumer is able to supply. Given the reliable transmission of information from the household through the bridge and network to the support center, it is anticipated that service will be significantly improved.

Problems and Solutions

The technology disclosed is useful to address a variety of problems. For instance, the problem of providing a user centric, multi-purpose interface to diverse consumer devices (CA and CE devices) in a home can be addressed using a handheld concierge device (a remote control) that relies redundantly or alternately on a home management bridge and/or cloud-based management servers, depending on their availability and the configuration selected. This concierge device sends input to and relies on the home management bridge, working in conjunction with the cloud-based management servers, to register devices in the home to be managed consumer devices. It accepts dynamically supplied menus verified to be up-to-date for control of the managed consumer devices. These menus may be updated from time to time, either to fix bugs or as device capabilities are updated. It can act as a remote control for the consumer devices, using the dynamically supplied menus. In some implementations, it relies on the home management bridge or the cloud-based management servers to transcode multimedia to format used by the remote control.

Another problem of providing efficiently connecting a user to technical support can be solved by the technology disclosed using a low cost concierge device with minimal processing power, a microphone, a speaker, one to a few function buttons and a wireless transceiver; and by pairing the concierge device with a consumer device, pressing one of the function buttons to initiate a call to a service center and utilizing resources in a bridge to 1) identify the consumer device and any current status codes to the service center and 2) convert voice communications between the concierge device and the bridge to a VoIP and relay the VoIP communications to the service center.

One option is for the consumer device to communicate with the bridge, after setting up the bridge with household information and enrolling the consumer device with the bridge. The bridge could be a computer or TV with a wireless or powerline connection to particular consumer devices and pairing protocols. A wireless connection could be direct or via a mesh, per Zigbee, Zwave, Lutron ClearConnect™ or enOcean-like communication protocols. The wireless connection may be WiFi, 3G, BT, DECT, Zwave, Zigbee or virtually any RF that is low cost. The distinguishing protocol could involve promiscuous identification of visible consumer devices, graphic depiction from a cache or network connection of the consumer devices identified on a display, accepting selection of a particular consumer device from a display, and instructing a user to adjust one or more settings of the particular consumer device to confirm pairing.

Consider the following example of on boarding a lamp to a home network and using the concierge device to control the lamp. The in home gateway detects the new lamp and communicates with the Cloud Remote™ resulting in an alert such as, "detected a new connected device 'Lamp'. To Accept device please voice authenticate by saying 'Confirm'" The user says "Confirm." Simple menu screen is loaded onto the concierge device following the registration, which optionally may include authentication by voice authentication. Optionally, a default or custom setup screen for the lamp setup appears with a few parameters. User presses "Defaults Accepted" on this screen. Of course, some devices may be so simple that no user setup is required, beyond registration. Subsequent menus of "Devices" include the now-registered lamp. The user can turn the lamp on and off from this screen. The user also can on board a switch and dedicate that switch to controlling the lamp. Then, the user can use either the switch or the concierge device to control the lamp.

The bridge alternatively could be a network appliance with a web server that is accessed from a computer or TV that provides a display. The bridge has a wireless or powerline connection to particular consumer devices and a pairing protocol that distinguishes consumer devices in the household from consumer devices visible but outside the household. The distinguishing protocol could involve promiscuous identification of visible consumer devices, serving a graphic depiction from a cache or network connection of the consumer devices identified on a display, accepting selection of a particular consumer device from a display, and instructing a user to adjust one or more settings of the particular consumer device to confirm pairing. The installation optionally includes reading a bar code on a device being coupled to the home management bridge.

Another option is for the concierge device to communicate with both the paired consumer device and a paired bridge, relaying information from the consumer device to the bridge.

The information relayed from the consumer device to the bridge could be pairing information that enables the consumer device and the bridge to pair, based on the concierge device having paired with each, or at least with the bridge.

Alternatively, the bridge could be a computer with a Bluetooth adapter and a device pairing protocol for pairing with the concierge device. The computer could set up the bridge with household information and enroll particular consumer devices with the bridge, using the concierge device to manage pairing. Or, the bridge could be housed in a refrigerator or other major appliance. Some refrigerators now include a display and even a Windows-based operating system. Similarly, A/V receivers and DVD players include substantial resources that could be harnessed by a bridge application and, optionally, a digital concierge application.

The concierge device could further include a camera that allows the user to show the service center a problem with the consumer device. The bridge could cause instructional images to be relayed to a display on the concierge device.

Sample Support Dialogs

Problems with a TV

1) Picture Resolution—In this dialogue, system configuration information has been relayed from the consumer device to the support center for use by the support person. The information may be relayed when the support call is initiated, after it begins, or even before the call, if it was sent by the consumer device to the support center in advance, following the disclosed setup. However the information is relayed to the support center, it is available in the support call without the user needing to verbalize or print and fax the configuration parameters. During the session, the support staff remotely reconfigures settings on the device. In practice, the dialog may require additional permission steps, such as verbally granting permission or taking an action using the concierge device or controls of the consumer device to give permission to the support staff to adjust settings. The user and support parts of the dialog are illustrated below:

USER: I cannot see the corners of the picture on the screen. The picture seems to be cropped.

SUPPORT: I see that even though your TV supports 1080P HD resolution, its resolution is set to 480i Video letter box mode. I have now adjusted the resolution to be set to 1080P full screen mode when you operate your set top box, Blu-Ray Player and gaming box which I see as the devices connected through your receiver to the screen. Can you see a full Test pattern on your screen now?

USER: Oh yes, thanks! The problem seems to have been resolved now.

2) Audio Fidelity—In this dialog, the support staff again uses configuration information and remote configuration adjustment to solve the user's problem.

USER: I cannot hear any sound from the rear speakers at all in my surround sound system.

SUPPORT: I see that the audio on your receiver is set to Dolby 2.1 mode. I will now change that to Dolby 5.1. Can you confirm audio from the rear speakers now?

USER: Oh yes, thanks! The problem seems to be resolved now.

3) Download issues—In this dialog, identification of the household or user allows the support person to spot an issue that has not generated a very informative error message.

USER: I don't seem to be able to download any movies. Can you please help me with that?

SUPPORT: Certainly. My Log shows that the Internet connection to your household has been up and running for the last 2 weeks without any interruptions. However, I am showing here that the primary credit card on your file has expired. Would you like me to update that information now? I can link the card ending in digits 5202 as the valid credit card. Is that OK?

USER: Oh yes, thank you.

SUPPORT: You should be able to download any movies at this point.

USER: Thank you!

4) Gamebox connection and control—Information from multiple devices is used for problem solving in this dialog. The bridge has been configured to forward information to the support center for more than just the Gamebox. This information may be forwarded after configuration of the TV to work with the bridge, as described above, or during the diagnostic session. Further permission dialog may be required to cause status information to be forwarded by more than just the Gamebox.

USER: Hi, I don't seem to be able to connect my Gamebox to my receiver and TV. Can you help me with that?

SUPPORT: Oh, certainly. I am showing here that your Gamebox reports correct functionality. However, your receiver is not set to select the proper video input when selecting the Gamebox. May I take corrective action for that?

USER: Yes, please.

SUPPORT: OK. The problem is now resolved. Also, your remote control programming has been set the proper input settings for next time.

USER: Great, thank you.

5) Gifting or cross-selling—In combination with problem solving, the support staff can either offer a gift or cross-sell a product or service that a happy customer might be enticed to buy:
 If Picture problem, then Audio gift
 If Audio problem, then Picture gift
 Free movie/trailer download 6) Coupon: Support assistance redeeming a free music/movie download coupon SUPPORT: Can I help you with anything else?

USER: Oh yes . . . Can you tell me what this means? User holds up a coupon in front of the remote camera for which a video image is seen: coupon is recognized.

SUPPORT: Oh you're entitled to a free view of the new feature film "Help". Would you like me to authorize that?

USER: Certainly.

SUPPORT: Anything else I can do?

USER: No thank you, appreciate the help

SUPPORT: You're welcome. And thank you for using CCC. Until next time, Goodbye!

USER: So long!

7) Market Research: survey followed by a free movie download coupon

SUPPORT: Before we finish the call, I would like to offer you a free movie download coupon in exchange for a few minutes of your time to conduct a brief survey on your most recent consumer device purchase. Would you like to accept the offer?

USER: Yes, of course.

SUPPORT: I am showing that the TV is your most recent purchase, is that right?

USER: Yes, that is correct.

SUPPORT: What is the one feature that you're the most happy with?

USER: The fact that it has a very easy-to-use customer support feature!

SUPPORT: Thank you. What is the one feature you're the least happy with?

USER: The intrusive nature of firmware updates. I wish I did not have to deal with that!

SUPPORT: What is the one feature that is missing that you would love to have on the next generation device?

USER: Automatic remote control configuration without me having to do anything or download an App.

SUPPORT: How can we improve our products or service for you?

USER: I wish I did not have to download a new app for every new device I purchase. And also, I am tired of trying to manage my applications . . . This should all be a whole lot simpler given the degree of connectivity and intelligence in these devices.

SUPPORT: What is the next consumer device that you're planning to purchase?

USER: A Blu-ray player

SUPPORT: Thanks! We would like to show you a promotional video on our new advanced Blu-Ray player that would be a perfect match for your current system. You will receive your coupon for free movie Problems with the Washing Machine 1) Not washing properly USER: My washing machine is working but the clothes do not smell clean anymore.

SUPPORT: I see that you've run 20 wash cycles without a clean cycle. Lingering bacteria from multiple washes builds up after a while. I would suggest that you leave the washer door open after you're done with the washer. You can also use clean cycle chemicals for maximum affect. I can send you a sample . . . if you order online here's a coupon for 20% off.

2) Cross selling—The support staff uses supply level information to offer refills, supplies and content in the following samples:

SUPPORT: Water filter on your refrigerator needs to be replaced. May I send you a refill pack?

SUPPORT: AC filter needs to be replaced. May I send you a refill pack?

SUPPORT: There are free promotional downloads for the Blu-Ray player that you recently purchased. May I authorize the downloads for you?

3) Coupon for free sample detergent, similar to above.

SUPPORT: Can I help you with anything else?

USER: Oh yes . . . Can you tell me what this means? User holds up a coupon in front of the remote camera for which a video image is seen: coupon is recognized SUPPORT: Oh you're entitled to free samples of detergent and fabric softener. May I have them sent to you?

USER: Certainly.

SUPPORT: Anything else I can do? USER: No thank you, appreciate the help

4) Market Research, as illustrated above.

High Level Description

The Concierge Connect Button

This button or other input sensor provides a convenient way for the user to request service for a device. When a support call is made using the concierge device—without having to even look up the number—the service person on the other side will be made aware of where the problem most probably lies. This can rely on Text, Voice or on Video+ Voice. It is a game-changer when it comes to the convenience it provides for both the consumer and the consumer device manufacturer. For the consumer, it means that no number needs to be looked up. The nature of the problem may already be apparent in the main database, sorted out by cloud analytics engines. Hours of wasted time can be prevented with this scheme. For the service person, it means that he is no longer at the mercy of the customer's description of the problem. The fact that the device is connected to the cloud and reports its status and any fault data to the cloud automatically, without any consumer intervention, facilitates the diagnosis and resolution of the issue by the customer service personnel, almost simultaneously as the call is made. For the consumer device company, it means that unnecessary product returns can be avoided. There is a reduced need to deeply educate the customer service personnel on all fault possibilities for all devices. The cloud computing resources sort out the problem proactively and can even provide the service personnel with appropriate actions to be taken automatically and proactively. The concierge device implementation need not be limited to thin clients. It can be provisioned as an application running on a mobile phone, tablet, and PC or other connected device.

Device Management

Upon connecting the disclosed concierge device to the Internet, it becomes possible to handle any other consumer device connected to the cloud. The concierge devices and methods of this disclosure afford several advantages. With this technology, any consumer device can connect to the cloud securely. It can interact with the cloud securely. It can use a cloud-based UI and device management. The technology disclosed caters to virtual apps: as soon as the consumer device is connected to the cloud, it is fully configured; its pre-packaged UI is associated with any concierge device, with its diagnostics/analytics package running in the cloud and ready to be leveraged. Menus, sometimes called thin clients or virtual apps, for the consumer device can be implemented on the concierge device dynamically or with a small cache. Such light weight virtual apps would not require user updating, though user permission to update could optionally be required on a device life or per installation basis. Consumer devices coupled to a concierge device are ready to be personalized, based on associated users' profiles. The are ready to be leveraged in advertising generated in the cloud, whether for purchasing related accessories or viewing relevant media.

Enhanced Concierge Device Configuration

Manufacturers should be encouraged by this technology to join a single centralized service or, at least, to rely on a single concierge device and connection with cloud-based services. A single concierge device should work with the consumer devices from at least a common manufacturer and also should work with several manufacturers' devices. The cloud could supply menus and remote control commands required for the concierge device to work with any device from any manufacturer.

Advertising Options on a Concierge Device with a Display

The concierge device configurations that include displays can be used to show advertising on the displays. U.S. application Ser. Nos. 11/350,980 and 60/709,666 filed Feb. 8, 2006 and Aug. 19, 2005, respectively, both entitled "Tethered Digital Butler Consumer Electronic Device and Method" depict devices that include displays. One of skill in the art will recognize that chipsets have changed since those applications were filed. At present, there are numerous suppliers of chipsets from which a designer might choose, including Broadcom, Texas Instruments, Intel, Marvell, ST Microelectronics, Nvidia and IBM.

When the concierge device is coupled to a television or source for a television signal, the display on the concierge device can be a secondary or supplemental display for supplemental information. Ads may be displayed as supplement information at opportune times. For instance, ads may be displayed while the user is fast forwarding rewinding or skipping through an ad or a series of advertisements. On the concierge device display, the user may see an ad logo, a program logo or some text. Analytics may be applied to determine the best content for the supplemental display. Alternatively, ads may be displayed while a user is viewing, fast forwarding or skipping through a program. The program logo, an ad logo, or chapter location information may be displayed on the supplemental display.

Ads that appear on the concierge device display may be synchronized with or independent of content being shown as the main program. For instance, when the main program reaches a sequence that involves product placement, such as product placement for advertising purposes, a coordinated ad may appear on the supplemental display. That is, if Ford has paid for a particular model of truck to appear in the program, the Ford logo may appear on the supplemental display or a picture of the particular truck may appear with a link for navigating to or remembering interest in that truck. Alternatively, ads for a competitor might appear on the supplemental display at the same time as the product placement. Similarly, ads may be directed to the supplemental display while advertising is being shown. On the supplemental display, the user may have a link or an option for remembering their interest in the product advertised on the main display. Alternatively, ads for competitors might appear on the supplemental display at the same time as the advertising on the main display. A variety of competitive alternatives may be offered in a single image on the supplemental display, coordinated with either the product placement or advertising on the main display.

The ad content on the concierge device may be audio, video, pictures, graphics, or web content. It may appear during a program or during advertising within a program. The ad selected for display on the supplemental screen may be program related, ad related, personal information related, user feedback related, user search related or user device related. Or, they may be served as banner ads, without consideration of user identity or recent user activity.

A server connected by a network may supply analytics for ad selection or personalization. The server may recognize the format of display on the concierge device or coordinated display and make sure that the ad is properly sized. The server may control the timing of ad delivery and which channel, audio or video, and is used to display the advertising. For instance: advertisements may relate to searches performed by the user via the remote. During a purchase cycle, ads may identify auxiliary device purchase suggestions. With an in-home device inventory, ads may describe available device upgrades based on existing devices at home. The ads may suggest media purchases related to existing devices Advertising can be displayed on the concierge device's display while a user is watching a program on TV. For instance, ads may get the user's attention while fast-forwarding through commercials. During the fast-forwarding, the concierge device may present an ad, an ad logo, or program logo, on the displayed of the remote. While fast-forwarding through a program, the program logo, or ad logo, can be displayed on the remote. Ads, can be directed to concierge device's display at anytime, independent of or dependent on—i.e., synced up—with the main program. Ads can play on the concierge device while a main program is running on main screen. Such ads may be, or not, related to main program content.

Ads shown on the concierge device may be identical to or secondary to ads a main ad is playing on main screen.

Virtually any content can be delivered by a concierge device with a display. The ad content may be audio, video, pictures or graphics or even web content, in its many forms.

Ads may be presented on the concierge during a program showing on a main screen or as alternative content as an ad is on-screen.

Targeted or interactive ads can be selected. Many selection criteria an be applied to ad display: ads may be program related, ad related, personal info related, user feedback related, user search related, user device related or general random.

Cloud-based servers can play a variety of roles in the systems disclosed. The cloud-based servers can provide analytics, ad selection, ad personalization, ad format, ad timing and/or an ad delivery mechanism. Virtually all ad-related functions can be served from the cloud.

Features of a concierge device can be combined in a variety of ways, depending on the configuration of the concierge device. In this disclosure, the concierge device is really a family of devices connecting to the cloud, as shown in the figures. A simple concierge device can include a microphone and speaker, without a display. On this simple device, programming options include using local or remote voice interaction to do the programming based on prompts from the device. Or, the concierge device could be programmed using a PC.

An alternative concierge device configuration includes with a thumb board or similar keyboard. In some implementations, this level of device will be similar to the simple concierge device, but with a keyboard for input and display for output.

In some implementations, a touch screen is built into a simple concierge device. The touch screen provides for input/output.

The connection architecture of a concierge device depends on the extent to which bridge and routing capabilities are built in. With an integrated router and bridge, a concierge device is direct to cloud ready (DTCR). The concierge device can interact with server in the cloud using a browser, such as a lightweight browser. Alternatively, with an integrated bridge, the concierge device interacts direct to cloud via Bridge (DTCB). The bridge has the intelligence to set up communication destinations and sessions. In some implementations, a host is built into the consumer device, such as a television or refrigerator. The concierge device communicates direct to cloud via Host (DTCH). It relies on intelligence built into the host.

Existing protocols can be adapted to the concierge devices capabilities and architectures described. Well-established protocols can be selected to handle pairing, connection, authentication and communication.

When a device, whether a concierge device, a home control device, a controllable device or a consumer device, is to be registered, cloud resource optionally are invoked. The concierge device can be registered to a cloud-based server, just like any other device. An appliance gets registered to cloud, either directly or by association with the remote.

Registration with a cloud based server can have utility in many ways. A cloud-based database can associate concierge devices with consumer devices. It can record specifics of devices, including specifics of concierge devices with differing capabilities. When a concierge device initiates a call, the database allows support personnel to know the user, device and history of problems with the specific device and the device family. The database provides friendly script for the support person to follow.

One-touch support button can be realized, optionally accompanied by advertising during the support session. By virtue of pre-existing remote and device-aware database in the Cloud, a support person or automated protocol knows what to address and who is asking. This eliminates preliminaries that sometimes dominate support sessions. The resulting support session may involve text exchanges, a voice or video connection and/or feedback on the concierge device or an nearby monitor (TV or PC). The advertising on concierge device, as described above, can be targeted based on key searches, programs being viewed, problematic appliances and/or relevant appliance upgrades. Optionally, the concierge device supports voice commands which may be recognized locally or reported to a server for recognition using, for instance, a VoIP connection.

A thin client model fits the concierge device architecture and hardware. A thin client can support the architectures identified above: direct to cloud (DTCR), device/cloud interaction through a lightweight browser; direct to cloud via Bridge (DTCB), in which the Bridge has the intelligence to set things up; or direct to cloud via Host (DTCH), in which the Host appliance has the intelligence. Going to the cloud is useful for several reasons. The UI can be generated in the cloud or with minimal effort on the device. Ads can be targeted from the cloud to users. Auto configuration routines and devices can be hosted and maintained in the cloud.

A variety of additional features can be disclosed at this point. Some implementations include tagging of devices so that concierge device can automatically recognize the tagged devices based on proximity to device. Tags using RFID, near field communication or similar technology can be suitably employed.

Personalization can include user recognition and/or authentication based on voice, fingerprints, RFID credentials, facial scans or event the way a user holds the concierge device, sensing the user's tremor pattern. Concierge devices can be initialized directly or in communication with a PC.

A direct-to-cloud API can support either remote procedure control or Web Services document exchange protocols to connect any device for cloud concierge support.

Virtual Apps, user interfaces and device management can be consolidated in the cloud. This consolidation would eliminate any need to download any apps. Consolidation in the cloud would assure that the concierge device was always up-to-date. The majority of UI requirements can be managed in the cloud, instead of on the local device. Learned user preferences can be used to target ads.

Each device can be given a unique permanent serial number. This ID can be programmed when the device is manufactured. The same database in the cloud can track a device from birth to death, from manufacturing to retail to home and on to when it is junked.

Services can be provided by a cloud-based platform. A premium human support service loosely analogous to GM's On-Star™ service for cars can be provided for home appliances/gadgets/etc. Automatic configuration can be fed to a connected device. Automatic UI generation can be hosted in the cloud. Light weight client and simple interfaces eliminate any need to download any apps. Control can be implemented even on a concierge device without a display using voice commands and prompts. Appliances can be shut down in cases of emergency. With the concierge device and/or a home management gateway acting in the background to monitor status without user direction, fault notification can be delivered via email, text or other messaging medium, sometimes before the user notices a problem.

Device configuration can be improved from defaults to take into account devices on the network that interacting with the device being configured.

The concierge device has the advantage of inducing one or more uniform data types, whether text, audio or video, which can be used to support all devices of interest. Moreover, support for user authentication makes the concierge device secure.

Example and Summary of Main Demo Screens
   Home Screen
   A variation on FIG. 10A can include icons for each of the following:
   Cloud Connect Concierge Screen
   VoIP/Video Call Screen
   Credit Card Transaction/Security Screen
   Interactive Remote Display Screen
   Touching an icon takes the user to a specific further screen.
   Screen 1
   FIG. 14A is the concierge support home screen. It showcases the essence and ease-of-use with which support and services may be invoked. In some implementations, clicking on a device highlights the device briefly and transitions to Screen 2. In other implementations, screen 2 may be preceded by an automated diagnostic protocol, as in the example of FIG. 14B.
   Screen 2
   FIG. 15 is a webcam shot of a concierge support person at their desk. This leads to an interaction—with full audio and, optionally, with video—between the user and the service personnel.
   There is a "Close Video Call" control which upon pressing transitions to Screen 3.
   Screen 3
   Following a support session, the display shows a summary for the problem just resolved. The statement may be generic enough to be applicable to any device/appliance chosen on or it may track the problem and solution reached during the support session. An ad may be positioned on this screen.
   Screen 4
   The VoIP/Video call screens, FIGS. 11A-B showcase a simple VoIP/Videocon interface.
   There may be a banner ad on top of the contacts list screen, FIG. 11A.
   Upon touching a name, go to FIG. 11B. Alternatively, upon launching a concierge support session, go to FIG. 15.
   Screen 5
   FIG. 15 is again a webcam shot of the concierge person at their desk. There is provision to turn video off for voice-only calls.
   There may be a banner ad on top of this screen.
   Screen 6
   The Credit Card Transaction Screen has the picture of a credit card on top. It is not shown in these figures.
   Below it is a dotted box on the screen used for finger print authentication purposes. FIG. 12A.
   There may be a banner ad on top of the screen.
   There can be a message saying the following: "Please touch the dotted box for secure authentication, or simply say 'I, John Smith, approve.'"
   Upon touching the dotted box, a message pops us saying "Transaction Approved."
   Screen 7
   FIG. 10A is a variation on an example interactive screen that displays some form of the screen below with the following four icons: LiveTV, IPTV, Home Control, and VoIP (No Games/Chat/Contacts/Settings).
   There may be a banner ad on top of the screen.

Some Particular Embodiments

The technology disclosed may be practiced as a method, device or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught—these recitations are hereby incorporated forward by reference into each of the following implementations.

Single Action Support
Implementation #1
One group of methods, devices, systems and articles of manufacture relates to using a concierge device to support consumer devices such as appliances and consumer electronics. In one implementation, a method is described that includes initiating a support session for a consumer device using a concierge device. The method includes: associating the concierge device with a selected consumer device; responsive to a single action performed by a user, the concierge device communicating with a home gateway. Communicating with the home gateway includes: causing the home gateway to buffer consumer device identification information for the selected consumer device; and causing the home gateway to initiate a support session for the consumer device and to forward automatically the consumer device identification information during the support session, thereby allowing the support session either to bypass an automated attendant or interactive voice recognition system or to initiate an automated support protocol. Optionally, communicating with the home gateway further includes causing the home gateway to determine a support center for a support session. This eliminates any need for the user to be aware of the support center contact information.

This method and other implementations of the technology disclosed can each optionally include one or more of the following features.

Associating can further include wirelessly pairing the concierge device with the selected consumer device and identifying the paired selected consumer device to the home gateway. Or, it can further include selecting the consumer device from a menu of candidate consumer devices known to the home gateway. The menu can be an audio menu or be displayed visually.

The home gateway can be a physical device separate and distinct from the concierge device, to which the concierge device sends messages via an in-home network. Or, it can be part of the same physical device as the concierge device. Alternatively, the home gateway can be a cloud-based device to which the concierge device sends messages via a network that extends outside the home.

The method can further include the concierge device receiving status information from the selected consumer device and forwarding the status information to the home gateway for use in the support session. Or, connecting with and receiving status information from the selected consumer device and using the status information in the support session.

The home gateway can feature relaying messages to and from the selected consumer device during the support session.

The method can further include displaying information received during the automated support protocol on a display of the concierge device. The information can include supplemental information displayed as the user is participating in the support session. This supplemental information can include a targeted or interactive advertisement.

The information transmitted during the support session can enable a user of the concierge device to bypass interactive response systems and begin the support session by talking to a human support agent, based on the forwarded consumer device identification information.

Other implementations may include a non-transitory computer readable storage medium storing instructions executable by a processor to perform a method as described above. Yet another implementation may include a system including memory and one or more processors configured or operable to execute instructions stored in the memory to perform a method as described above.

Implementation #2

Another implementation of the technology disclosed is a concierge device including at least one wireless data communication adapter, one or more input sensors, one or more outputs, and memory; and at least one processor configured to perform operations. Those operations are including: associating the concierge device with a selected consumer device; responsive to a single action performed by a user, the concierge device communicating with a home gateway. Communicating with the home gateway includes causing the home gateway to buffer consumer device identification information for the selected consumer device; and causing the home gateway to initiate a support session for the consumer device and to forward automatically the consumer device identification information during the support session, thereby allowing the support session either to bypass an automated attendant or interactive voice recognition system or to initiate an automated support protocol. Optionally, communicating with the home gateway further includes causing the home gateway to determine a support center for a support session.

This device and other implementations of the technology disclosed can each optionally include one or more of the following features.

Associating can further include wirelessly pairing the concierge device with the selected consumer device and identifying the paired selected consumer device to the home gateway. Or, it can include selecting the consumer device from a menu of candidate consumer devices known to the home gateway. The menu can be an audio menu or it can be displayed visually.

The home gateway can be a physical device separate and distinct from the concierge device and having its own processor, to which the concierge device is configured to send messages via an in-home network. Or, it can be a part of the same physical device as the concierge device. Alternatively, the home gateway can be a cloud-based device to which the concierge device sends messages via a network that extends outside the home.

The processor of the concierge device can be further configured to perform operations that include displaying information received during the automated support protocol on a display of the concierge device. The information can include supplemental information displayed as the user is participating in the support session. This supplemental information can include a targeted or interactive advertisement.

Generally, the processor(s) implementing this technology can be configured to perform operations reflecting any of forgoing methods and their aspects or features.

Implementation #3

Another implementation of the technology disclosed is a concierge device that includes: at least one wireless data communication adapter, one or more input sensors, one or more outputs, and memory; and at least one processor configured to perform operations. Those operations are including: linking the concierge device to data that uniquely identifies a particular consumer device to be supported; and responsive to a single user action sensed by the input sensors, causing a home gateway to initiate contact with a service center that supports the particular consumer device, including automatically transmitting information from which the service center can uniquely identify the particular consumer device and determine whether to engage an automated support protocol based on the particular consumer device to be supported. The information can, for instance, be a serial number or locally unique assigned name plus a concierge device, household or home gateway identifier.

This device and other implementations of the technology disclosed can each optionally include one or more of the following features.

The device may be configured to perform operations including selecting the particular consumer device to be supported from a plurality of consumer devices. It also may determine which of several support centers to initiate contact with to support the particular consumer device.

It may further include a display; and further be configured to perform operations including: automatically transmitting status information regarding the particular consumer device to the service center; and displaying information received from the service center during the automated support protocol.

The concierge device processor can further be configured to perform operations including: causing the particular consumer device to be coupled in data communication with the support center, thereby allowing diagnostic communications between the particular consumer device and the support center. The communications between the particular consumer device and the support center can be relayed or direct, peer-to-peer.

In some implementations, the concierge device processor further configured to perform operations including conducting a support call with the support processor regarding the particular consumer device using the concierge device to capture the user's voice and to reproduce audio for the user to hear.

Some implementations of the technology disclosed include a service center that provides diagnostic support of a particular consumer device, the service center coupled in communication with the concierge device; wherein the service center includes at least one service processor configured to perform operations including: identifying the particular consumer device from the automatically transmitted information; and engaging in an automated support protocol based on the particular consumer device to be supported. alternatively, the service processor can be configured to perform operations including: determining from the automatically transmitted information to bypass automated support and connect the user with a human; and engaging in at least audio communications with the concierge device.

Other implementations include a gateway device coupled in communication with the concierge device; wherein the gateway device includes at least one gateway processor configured to perform operations including: relaying communications between the concierge device and the service center; registering a plurality of consumer devices that are linkable to the concierge device; and providing a menu from which to select of the particular consumer device for the concierge device to support. The menu services involve perceptible communications with the user using the input sensors and outputs of the concierge device.

Implementation #4

Another implementation of the concierge device includes at least one wireless data communication adapter, one or more input sensors, one or more outputs, and memory; and at least one processor configured to perform operations. The operations are including: linking the concierge device to data that uniquely identifies a particular consumer device to be supported; responsive to a single user action directed to the concierge device, initiating at least voice contact with a service center that supports the particular consumer device, including automatically transmitting to the service center information from which the service center can uniquely identify the particular consumer device; and conducting a support call with the service center regarding the particular consumer device using the concierge device to capture the user's voice and to reproduce audio for the user to hear.

The concierge device processor can further be configured to perform operations including causing the particular consumer device to be coupled in communication with the support center during the support call.

The concierge device may further include a display on the concierge device that provides visual information to the user during the support call and/or a camera on the concierge device that provides visual information to the support center during the support call.

Implementation #5

The technology disclosed can be implemented in a consumer appliance with an integrated concierge device, based on any of the devices, aspects or features described above. For instance, the concierge device can be integrated into a refrigerator, washing machine, dryer, exercise equipment, television, A/V center, stove, among other consumer appliances and electronic devices.

Generally, the technology can be implemented as a consumer appliance with an integrated concierge device, including: a consumer device with appliance features, adapted to report status information; at least one network adapter; a memory; at least one input sensor; at least one audio input; an audio output; a processor coupled to the network adapter, the memory, the audio input, and the audio output; instructions running on the processor. The instructions running on the processor may cause the integrated device to communicate with a home management gateway; and cause the gateway to initiate a support call, responsive to a user interacting with the input sensor, and to provide information regarding the associated consumer device that allows the support call to bypass an automated attendant or interactive voice recognition system and that identifies the associated consumer device to be supported. In some implementations, the consumer device can have an integrated home management gateway.

Other implementations may include a non-transitory computer readable storage medium storing instructions executable by a processor to perform a method as described above. Yet another implementation may include a method including actions implemented by the processors of the device of system as described above.

Implementation #6

In another implementation, a method is described that includes initiating a support session responsive to a single user action. This includes linking a concierge device to data that uniquely identifies a particular consumer device to be supported; and, responsive to a single user action sensed by one or more input sensors of the concierge device, initiating contact with a service center that supports the particular consumer device, including automatically transmitting information from which the service center can uniquely identify the particular consumer device and determine whether to engage an automated support protocol based on the particular consumer device to be supported.

This method and other implementations of the technology disclosed can each optionally include one or more of the following features.

The method may further include selecting the particular consumer device to be supported at a particular time from a plurality of consumer devices and/or determining which of several support centers to initiate contact with to support the particular consumer device.

Other implementations can include automatically transmitting status information regarding the particular consumer device to the service center; and displaying information received from the service center during the automated support protocol on a display of the concierge device.

Another optional feature includes causing the particular consumer device to be coupled in data communication with the support center, thereby allowing diagnostic communications between the particular consumer device and the support center. The communications may be relayed or direct, peer-to-peer. Some implementations include conducting a support call with the support processor regarding the particular consumer device using the concierge device to capture the user's voice and to reproduce audio for the user to hear.

The method may further include actions of a service center, including: identifying the particular consumer device from the automatically transmitted information; and engaging in an automated support protocol based on the particular consumer device to be supported. Alternatively, the service center can determine from the automatically transmitted information to bypass automated support and connect the user with a human; and to engage in at least audio communications with the concierge device.

The method may further include actions of a gateway device coupled in communication with the concierge device including: relaying communications between the concierge device and the service center; registering a plurality of consumer devices that are linkable to the concierge device; and providing a menu from which to select the particular consumer device for the concierge device to support. It also can include menu services as describe above.

Implementation #7

In another implementation, a method is described that includes: linking a concierge device to data that uniquely identifies a particular consumer device to be supported; responsive to a single user action directed to the concierge device, initiating at least voice contact with a service center that supports the particular consumer device, including automatically transmitting to the service center information from which the service center can uniquely identify the particular consumer device; and conducting a support call with the service center regarding the particular consumer device using the concierge device to capture the user's voice and to reproduce audio for the user to hear.

The method can further include causing the particular consumer device to be coupled in communication with the support center during the support call.

In some implementations, the method further includes a camera on the concierge device displaying visual information from or sending it sending to the support center during the support call.

Linking can further include the concierge device interacting with an home management gateway that maintains a copy of the data that uniquely identifies the particular consumer device. Or, it can include the concierge device interacting with the home management gateway that maintains a copy of the data that uniquely identifies the particular consumer device.

Automatically transmitting may include sending product model information for the particular consumer device and user identifiable information to the support center.

In some implementations, the user could be directed in the support call to interact with an artificial intelligence that converses.

Implementations #8

Another implementation involves a method of initiating a service call for a consumer device using a concierge device, including: pairing the concierge device wirelessly with the consumer device; receiving from the paired consumer device some consumer device identification information; and responsive to a single action performed by a user, the concierge device communicating with a home management gateway. Communicating with the home management gateway includes forwarding the consumer device identification information to the home management gateway; and causing the gateway to initiate a support call for the consumer device and to forward the consumer device identification information during the support call, thereby allowing the support call to bypass an automated attendant or interactive voice recognition system or to engage with an online or alternative support protocol and identifying the associated consumer device to be supported.

Some implementations further include the concierge device receiving status information from the paired consumer device and forwarding the status information to the home management gateway for use during the support call.

Implementations #9-10

Another implementation involves a method of initiating a service call for a consumer device using a concierge device, the method including: selecting the consumer device from a display of candidate consumer devices known to a home management gateway. Following this initial selecting action, aspects and implementations of this method are as in the preceding methods, aspects and implementations. Another alternative for this initiating action includes: pairing the concierge device wirelessly with the consumer device; receiving from the paired consumer device some consumer device identification information; and responsive to a single action performed by a user, the concierge device communicating with a home management gateway.

Another optional feature of this technology is the home management gateway connecting with and receiving status information from the associated consumer device and forwarding the status information to a service center in advance of the service call.

Other implementations may include a non-transitory computer readable storage medium storing instructions executable by a processor to perform a method as described above. Yet another implementation may include a system including memory and one or more processors configured or operable to execute instructions stored in the memory to perform a method as described above.

Implementation #11

One method involves initiating a support call for the consumer device using the concierge device. This method begins with associating the concierge device with the selected consumer device. Responsive to a single action performed by user, the concierge device communicates with the home management bridge. This communication causes the home management bridge to buffer consumer electronic identification information for the associated consumer device. It further causes the bridge to initiate a support call for the consumer device and to forward the consumer electronic information during the support call. Forwarding this information, optionally, allows the support call to bypass an automated attendant or interactive voice recognition system. Or, it could be used to select a tailored interactive voice or visual protocol for trouble shooting. It also could be used to initiate an artificially intelligent interaction using technology such as the Watson technology demonstrated in 2011 by IBM. It further identifies the associated consumer device to be supported. This should greatly improve the user support experience.

We refer to associating the consumer device with the concierge device, because there are several ways in which this association may take place. The concierge device may be wirelessly paired with the selected consumer device. Identification of the consumer device may be programmed into the concierge device memory, either at the factory or locally using a PC or similar device. The programming may be accomplished wirelessly using a USB connection. Alternatively, the home management bridge can be used to display candidate consumer devices and select one for temporary association with the concierge device. The concierge device can greatly simplify on boarding and optionally provide authentication during an on boarding process, which would provide a degree of assurance to consumers who are weary of home appliances connected to a cloud.

We refer to buffering consumer electronic identification information, as there are several ways in which the bridge may obtain this information. First, the home management bridge may receive consumer electronic status information associated with the consumer device from the concierge device, relayed to the bridge after pairing between the concierge device and the consumer device. Second, it may receive the information directly by communicating with the consumer device identified by the concierge device, after pairing between the concierge device and the consumer device. Third, the concierge device may identify the consumer device to the bridge and the bridge may obtain the information needed from the consumer device directly. Fourth, the relevant information can be input into the bridge, using a conventional input, such as a keyboard, mouse, touch screen or voice recognition. Fifth, information can be obtained from a cloud-based data source. For instance, the device may be registered at its point of sale with a cloud-based management server.

Methods of initiating a support call can be more directly stated, beginning with the manner in which the concierge device is associated with the consumer device. One method variation of initiating a support call for the consumer device using the concierge device begins with pairing the concierge device wirelessly with the consumer device. Those familiar with pairing Bluetooth headsets to wireless telephones or recognize a wide variety of pairing options. The method proceeds with the concierge device receiving from the paired consumer device some consumer electronic identification information. Responsive to a single action performed by user, the concierge device communicates with the home management bridge. It forwards consumer electronic information to the home management bridge and causes the home management bridge to initiate a support call. The bridge forwards the consumer electronic identification information during the support call, thereby allowing the support call to bypass an automated attendant or interactive voice recognition system. The bridge identifies the associated consumer device to be supported during the call.

Implementation #12

Another method of initiating a support call begins with selecting a consumer device from the display of candidate consumer devices known to the home management bridge. In this method, the home management bridge supports multiple consumer devices. Responsive to a single action performed by user, the concierge device communicates with the home management bridge. This causes the home management bridge to initiate a support call for the selected consumer device and to forward consumer electronic identification information to the support center. The consumer electronic identification information can be obtained either by communications between the bridge and the selected consumer device or by entry of information through the bridge. The information may be provided in advance of the phone call, so that only a serial number or other globally unique identifier needs to be provided.

Implementation #13

A variety of devices and systems also practice the disclosed technology. One is the concierge device that initiates support calls for associated consumer devices. The support calls are initiated by the home management bridge. The concierge device includes at least one wireless transceiver adapted to be coupled in communication with at least one home management bridge. The concierge device further includes a memory, at least one button or other single action control, speaker and microphone, and a processor coupled to the transceiver, the memory, the button, the speaker and microphone. Examples of single action controls include a button, toggle or other physical switch, touch areas on a touch screen, a motion sensor or a voice activated control. Instructions are provided running on the processor that wirelessly couples the concierge device to the home management bridge. One skilled in the art will recognize that processor is a broad term, which may include both the CPU and the wireless communications components. The instructions further forward concierge device information to the home management bridge and cause the bridge to initiate a support call, responsive to a single user action such as pressing a button. Instructions further cause a bridge to provide information regarding the associated consumer device that allows the support call to bypass an automated attendant or interactive voice recognition system and that identifies the associated consumer device to be supported. The identification may be direct or indirect, specific or categorical. Preferably, it would include the serial number of the consumer device, to facilitate verification of support eligibility and is data for subsequent analytics at the support center.

As one option, the wireless transceiver may be adapted to be coupled in communication with at least one associated consumer device. Instructions running on the processor of the concierge device may further wirelessly couple the concierge device to the associated consumer device and obtain from the associate consumer device some consumer electronic identification information. Then, the instructions cause the consumer electronic information to be forwarded to the home management bridge, which in turn is relied upon to forward the consumer electronic identification information during the support call.

A further aspect of this option is that the instructions running on the processor may further relay diagnostic status information from the consumer device to the home management bridge for use in the support call.

As another option, the concierge device may include at least one wireless transceiver adapted to be coupled in communication with at least one consumer device. Instructions running on its processor further wirelessly couple the concierge device to the consumer device, obtain some consumer electronic identification information from the device and forward this information to the bridge. The instructions further cause and rely on the bridge to pair with the consumer device using the consumer electronic identification information. This makes information available to the home management bridge for use in the support call.

As illustrated in FIG. 4, the concierge device may be built into a refrigerator or other major appliance. In this illustration, the bridge would be built into the refrigerator as well as the concierge device. Alternatively, as depicted in FIGS. 5-6, the bridge could be a standalone device or built into a TV or signal source for a TV, such as a A/V receiver, a DVD, cable or satellite box.

Yet another option is for the concierge device to have consumer electronic identification information loaded into its memory. Information from the memory of the concierge device may be forwarded to the home management bridge for use during the support call.

In connection with any of the methods and devices described above, the concierge device further may include a camera coupled to the processor. Instructions running on the processor further will wirelessly couple the camera with the home management bridge and cause the home management bridge to forward images from the camera during the support call. The images may be still or moving images.

In further connection with the methods and devices described above, the concierge device may include a display coupled to the processor. Instructions running on the processor may cause the concierge device to receive and display images received from the home management bridge during the support call. Combining the camera and display features described in these successive paragraphs essentially provides a two-way videoconference.

The concierge device as described above may be combined into a system that includes a home management bridge. Such a home management bridge includes at least one wireless transceiver adapted to be coupled in communication with at least one concierge device, a method, network interface and a processor coupled to each of the above. Instructions running on the processor wirelessly couple the home management bridge to the concierge device and receive concierge device information from the concierge device. The instructions are further adapted to initiate a support call, responsive to a request from the concierge device, and to provide information regarding the associated consumer device to a support system that allows the support call to bypass an automated attendant or interactive voice recognition system. The information further identifies the associated consumer device to be supported.

In some sense, the concierge device described may act as the eyes, ears and voice of the bridge or cloud based service for interacting with users across a wide variety of consumer device, making the connected, intelligent home a manageable reality for consumers.

On Boarding Claims

Another group of methods, devices, systems and articles of manufacture relates to using a concierge device to on-board home control devices and controllable devices to a home management gateway.

Implementation #14

One implementation describes a method of on boarding to an in-home management bridge both a control device and a controlled device. This method is including: receiving a first enrollment signal from the first home control device that uniquely identifies the first home control device, automatically determining control capabilities of the first home control device and enrolling the first home control device with the management bridge; receiving a second enrollment signal from the second controllable device that uniquely identifies the second controllable device, automatically determining control signals recognized by the second controllable device and enrolling the second controllable device with the management bridge; and receiving a dedication signal responsive to a user interface and automatically configuring a combination of the management bridge, the first home control device and the second controllable device so that at least some control signals generated by the first home control device are dedicated to controlling the second controllable device.

This method and other implementations of the technology disclosed can each optionally include one or more of the following features.

The method can further include automatically replicating the control capabilities of the first home control device on a concierge device coupled in communication with the management bridge. This can further involve displaying the user interface used to generate the dedication signal on a display of the concierge device.

Some implementations include displaying supplemental information on a display of the concierge device. This supplemental information can be a targeted or interactive advertisement.

The method can involve the management bridge requesting of and receiving from a cloud-based server at least some configuration data used when automatically configuring the combination.

The management bridge may take on alternative configurations. In one implementation, the management bridge is a physical device separate and distinct from the concierge device; and the concierge device sends messages to and receives messages from the management bridge via an in-home network. In another implementation, the management bridge is part of the same physical device as the concierge device.

Another implementation includes scanning packaging or a tag accompanying either the first home control device or the second controllable device to generate the first or second enrollment signal, respectively. Scanning may be implemented in a variety of ways, including optically scanning a pattern on a label or wirelessly scanning an RFID tag.

The dedicating action can further include receiving one or more user selections responsive to the user interface that select the first home control device from a plurality of home control devices and that select the second controllable device from a plurality of controllable devices.

Alternative messaging patterns can be implemented. The dedicating action can further include configuring one or more of the first home control device and the second controllable device for peer-to-peer control interaction. Or, it can include configuring the management bridge to receive the first control signals from the first home control device and send the second control signals to the second controllable device, responsive to the first control signals.

Inventorying devices to enroll can precede receiving enrollment signals. Some implementations further include: establishing an inventory of uniquely identified home control devices and controllable devices with the management bridge, the inventory including at least the first home control device and the second controllable device; matching information in the first enrollment signal to the inventory during the enrolling of the first home control device with the management bridge; and matching information in the second enrollment signal to the inventory during the enrolling of the second controllable device with the management bridge. The inventorying can further include scanning packaging or a tag accompanying either the first home control device or the second controllable device to inventory the first home control device or the second controllable device, respectively, and the options identified above for scanning.

Some implementations further include authenticating a user prior to receiving the identification of the unregistered unit and initiating an enrollment mode in which enrolling and dedicating are permitted. Authenticating can require the user to physically interact with a concierge device that previously was enrolled with the management bridge or that implements the enrollment with the management bridge. Alternatively or in addition, authenticating can require receiving biometric information from the user.

Other implementations may include a non-transitory computer readable storage medium storing instructions executable by a processor to perform a method as described above. Yet another implementation may include a system including memory and one or more processors configured or operable to execute instructions stored in the memory to perform a method as described above.

Implementation #15

Another implementation of the technology disclosed is a system with a home management bridge including at least one network communication adapter, and memory; and at least one processor configured to perform operations. The operations are including: receiving a first enrollment signal from the first home control device that uniquely identifies the first home control device, automatically determining control capabilities of the first home control device and enrolling the first home control device with the management bridge; receiving a second enrollment signal from the second controllable device that uniquely identifies the second controllable device, automatically determining control signals recognized by the second controllable device and enrolling the second controllable device with the management bridge; and receiving a dedication signal responsive to a user interface and automatically configuring a combination of the management bridge, the first home control device and the second controllable device so that at least some control signals generated by the first home control device are dedicated to controlling the second controllable device.

This system and device and other implementations of the technology disclosed can each optionally include one or more of the features described above in the method context.

Some implementations involve a system including the home management bridge and further including a concierge device that comprises at least one input sensor and at least one output, in which the processor is further configured to perform operations including automatically replicating the control capabilities of the first home control device on a concierge device coupled in communication with the management bridge.

In some implementations of this system, the concierge device further includes at least one processor configured to perform operations including displaying the user interface used to generate the dedication signal on a display of the concierge device.

The concierge device in this system can further include at least one processor configured to perform operations including displaying supplemental information on a display of the concierge device. The supplemental information can be a targeted or interactive advertisement.

Systems of this sort can further include a scanning device configured to scan packaging or a tag accompanying either the first home control device or the second controllable device to generate the first or second enrollment signal, respectively.

In some implementations, the dedicating action further includes receiving one or more user selections responsive to the user interface that select the first home control device from a plurality of home control devices and that select the second controllable device from a plurality of controllable devices.

In some implementations, the management device processor is further configured to perform operations including authenticating a user prior to receiving the identification of the unregistered unit and initiating an enrollment mode in which enrolling and dedicating are permitted. Authenticating can require the user to physically interact with the concierge device, which previously was enrolled with the management bridge or which implements the enrollment with the management bridge. Alternatively or in addition, authenticating can require receiving biometric information from the user.

Other implementations may include a non-transitory computer readable storage medium storing instructions executable by a processor to perform a method as described above. Yet another implementation may include a method including actions implemented by the processors of the device of system as described above.

Implementation #16

Another method implementation includes: receiving an identification of an unregistered in-home unit that uniquely identifies the unit, wherein the unit is an in-home appliance control device or controllable device and control devices are complementary to controllable devices; registering the unit using the identification received; and receiving intended connection information and configuring a connection between the registered unit to a previously registered complementary unit to establish a unit pair, wherein the connection causes a controllable unit of the unit pair to be controlled responsive to control signals sent by a control unit of the unit pair.

Configuring the connection can further include configuring a bridge device to receive signals from the control unit and relay them to the controllable unit accompanied by an identifier accepted by the controllable unit. In some implementations, the bridge device adds the identifier accepted by the controllable unit to a control signal.

The bridge device can be physical distinct from and not incorporated in either the control unit or the controllable unit. It can be incorporated into a concierge device.

Configuring the connection can further include configuring the controllable unit to accept signals sent by the control unit that are accompanied by a control unit identification. When the unit registered is the control unit, registering the control unit can further include identifying control signals generated by the control unit. When the unit registered is the controllable unit, registering the controllable unit can further include identifying control signals accepted by the controllable unit.

In some implementations, the method further includes configuring a programmable home control device with a display: to allow user selection of the control device from the display; to allow user selection of controls provided by the control unit; and to send control signals from the home control device that cause the controllable unit to be responsive as if the signals had been sent by the control unit.

The method can further include authenticating a user prior to receiving the identification of the unregistered unit and initiating a registration mode in which registering and connecting are permitted. As described above, authenticating can require interaction with the concierge device and/or biometric information from the user.

Some implementations further include: registering a plurality of unregistered control units and a plurality of unregistered controllable units; and configuring connections among the control and controllable units after registering the plurality of units.

Identifications of the plurality of unregistered units can be obtained by scanning packaging or tags accompanying with the unregistered units, applying any conventional scanning technique such as those mentioned above.

Other implementations may include a non-transitory computer readable storage medium storing instructions executable by a processor to perform a method as described above. Yet another implementation may include a system including memory and one or more processors configured or operable to execute instructions stored in the memory to perform a method as described above.

Implementation #17

Some further device implementations include at least one network communication adapter, one or more input sensors, one or more outputs, and memory; and at least one processor configured to perform operations. The operations are including: receiving an identification of an unregistered in-home unit that uniquely identifies the unit, wherein the unit is an in-home appliance control device or controllable device and control devices are complementary to controllable devices; registering the unit using the identification received; and receiving intended connection information and configuring a connection between the registered unit to a previously registered complementary unit to establish a unit pair, wherein the connection causes a controllable unit of the unit pair to be controlled responsive to control signals sent by a control unit of the unit pair.

This device and other implementations of the technology disclosed can each optionally include one or more of the device features described above.

Implementation #18

Several implementations involve inventorying units before enrolling them. One of these implementations describes a method of on boarding and interconnecting home control devices with controllable devices that includes: establishing an inventory of uniquely identified home control devices and controllable devices with an in-home management bridge, the inventory including at least a first home control device and a second controllable device; receiving a first enrollment signal from the first home control device that uniquely identifies the first home control device, matching information in the first enrollment signal to the inventory, and enrolling the first home control device with the management bridge; receiving a second enrollment signal from the second controllable device that uniquely identifies the second controllable device, matching information in the second enrollment signal to the inventory, and enrolling the second controllable device with the management bridge; receiving a dedication signal responsive to a user interface and automatically configuring a combination of the management bridge, the first home control device and the second controllable device so that control signals generated by the first home control device are dedicated to controlling the second controllable device; and replicating control capabilities of the first home control device on a concierge device coupled in communication with the management bridge.

The dedicating action can further include configuring one or more of the first home control device and the second controllable device for peer-to-peer control interaction.

Some implementations further include automatically determining first control signals generated by the first home control device and second control signals that control the second controllable device; wherein the dedicating action further includes configuring the management bridge to receive the first control signals from the first home control device and send the second control signals to the second controllable device, responsive to the first control signals.

Some implementations further include providing an interface that enables a user to select dedication of control signals generated by the first home control device to control of the second controllable device.

An alternative implementation describes a method of on boarding an in-home controllable device to a management bridge and automatically configuring a concierge device to control the controllable device, including: establishing an inventory of uniquely identified controllable devices with an in-home management bridge, the inventory including at least a first in-home controllable device; receiving a first enrollment signal from the first in-home controllable device that uniquely identifies the first controllable device, matching information in the first enrollment signal to the inventory, and enrolling the first controllable device with the management bridge; and automatically determining first control signals used to control the first controllable device and configuring a concierge device coupled in communication with the management bridge with one or more menu items that control the first controllable device using the first control signals.

Another alternative implementation describes a method of on boarding an in-home control device to a management bridge and automatically configuring a concierge device to replicate control capabilities of the controllable device, including: establishing an inventory of uniquely identified control devices with an in-home management bridge, the inventory including at least a first in-home control device; receiving a first enrollment signal from the first in-home control device that uniquely identifies the first control device, matching information in the first enrollment signal to the inventory, and enrolling the first control device with the management bridge; and automatically determining first control signals generated by the first control device and configuring a concierge device coupled in communication with the management bridge with one or more menu items that replicate control capabilities of the first control device.

Other implementations may include a non-transitory computer readable storage medium storing instructions executable by a processor to perform a method as described above. Yet another implementation may include a system including memory and one or more processors configured or operable to execute instructions stored in the memory to perform a method as described above.

Implementation #19

Another implementation describes a method of on boarding to an in-home management bridge both a control device and a controlled device. This method includes: establishing an inventory of uniquely identified home control devices and controllable devices with an in-home management bridge, the inventory including at least a first home control device and a second controllable device; receiving a first enrollment signal from the first home control device that uniquely identifies the first home control device, matching information in the first enrollment signal to the inventory and enrolling the first home control device with the management bridge; receiving a second enrollment signal from the second controllable device that uniquely identifies the second controllable device, matching information in the second enrollment signal to the inventory, and enrolling the second controllable device with the management bridge; receiving a dedication signal responsive to a user interface and automatically configuring a combination of the management bridge, the first home control device and the second controllable device so that at least some control signals generated by the first home control device are dedicated to controlling the second controllable device.

As above, this method and other implementations of the technology disclosed can each optionally include one or more of the following features.

Some implementations further include replicating control capabilities of the first home control device on a concierge device coupled in communication with the management bridge.

Dedicating can further include configuring one or more of the first home control device and the second controllable device for peer-to-peer control interaction. Or, it can involve automatically determining first control signals generated by the first home control device and second control signals that control the second controllable device, and configuring the management bridge to receive the first control signals from the first home control device and send the second control signals to the second controllable device, responsive to the first control signals.

Implementations also can include providing an interface that enables a user to select dedication of control signals generated by the first home control device to control of the second controllable device.

Another implementation describes a method of on boarding an in-home controllable device to a management bridge and automatically configuring a concierge device to control the controllable device, including: establishing an inventory of uniquely identified controllable devices with an in-home management bridge, the inventory including at least a first in-home controllable device; receiving a first enrollment signal from the first in-home controllable device that uniquely identifies the first controllable device; matching information in the first enrollment signal to the inventory; and enrolling the first controllable device with the management bridge.

This automatic configuring method can optionally include one or more of the features described above. It also can involve automatically determining first control signals used to control the first controllable device and configuring the concierge device coupled in communication with the management bridge with one or more menu items that control the first controllable device using the first control signals.

Some implementations involve on boarding either an in-home control device or a controllable device to a management bridge. When just the in-home control device is enrolled, the method can include automatically configuring a concierge device to replicate controls of the control device; establishing an inventory of uniquely identified control devices with an in-home management bridge, the inventory including at least a first in-home control device; receiving a first enrollment signal from the first in-home control device that uniquely identifies the first control device; matching information in the first enrollment signal to the inventory; and enrolling the first control device with the management bridge.

When just the in-home controllable device is enrolled to a management bridge, the method can include automatically configuring a concierge device to control the controllable device; receiving a first enrollment signal from the first in-home controllable device that uniquely identifies the first controllable device; automatically determining first control signals used to control the first controllable device; and enrolling the first controllable device with an in-home management bridge.

Some implementations further include automatically configuring a concierge device coupled in communication with the management bridge with one or more menu items that control the first controllable device, implementing at least some of the first control signals.

Another method of on boarding an in-home control device to a management bridge and automatically configuring a concierge device to replicate control capabilities of the control device, includes: receiving a first enrollment signal from the first in-home control device that uniquely identifies the first control device, automatically determining first control signals used to control the first controllable device, and enrolling the first controllable device with an in-home management bridge; automatically determining first control signals generated by the first control device; and configuring a concierge device coupled in communication with the management bridge with one or more menu items that replicate control capabilities of the first control device.

Other implementations may include a non-transitory computer readable storage medium storing instructions executable by a processor to perform a method as described above. Yet another implementation may include a system including memory and one or more processors configured or operable to execute instructions stored in the memory to perform a method as described above.

Virtual Apps and Advertising
Implementation #20

Some implementations describe a concierge device that redundantly connects to an associated consumer device to an in-home management bridge or to cloud-based management server. The concierge device includes: at least one wireless transceiver and network protocol stack adapted to be coupled in communication with at least a home management bridge and cloud-based management server; a memory; at least one user input sensor (which optionally could be the microphone identified below); a display; a speaker and microphone; a processor coupled to the transceiver, the memory, the input sensor, and the display; instructions running on the processor. The instructions, when executed, cause the concierge device to: wirelessly couple the concierge device to the in-home management bridge; wirelessly couple the concierge device to the cloud-based management server; sense availability or unavailability of the in-home management bridge and the cloud-based management server; preferentially rely on one of the in-home management bridge or the cloud-based management server and alternatively rely on the other one; register the consumer device through the in-home management bridge or alternatively through the cloud-based management server; responsive to the registration of the consumer device, receive one or more control menus for the consumer device and control strings to send directly or indirectly to the consumer device to implement selections from the control menus; and responsive to actions of a user, send directly or indirectly to the consumer device the control strings.

This device and other implementations of the technology disclosed can each optionally include one or more of the following features.

The concierge device can be coupled in communication with at least one consumer device through the in-home management bridge. This communication can be direct, through the in-home management bridge or through a wireless access point.

The user input sensor can be a button, a motion sensor, an orientation sensor, or a microphone.

In some implementations, the concierge device accepts control menus for control of appliances, including at least a refrigerator, dishwasher and washing machine.

The concierge device describe above may further include instructions running on the processor that: forward concierge device identification information to the in-home consumer management bridge or alternatively to the cloud-based consumer management services, depending on availability; and cause the in-home consumer management bridge or the cloud-based consumer management services to initiate a support call, responsive to a user pressing the button, and to provide information regarding the associated consumer device that allows the support call to bypass an automated attendant or to invoke an interactive voice recognition system using information specific to the associated consumer device.

In some implementations, the concierge device includes instructions that cause the concierge device to store information particular to a plurality of consumer devices as they are registered and to make that information available for control or support of the consumer devices either directly or via the bridge, responsive to selection of a particular associated consumer device.

Instructions running on the processor can cause the processor of the concierge device to receive alert messages regarding completion of a task by an in-home consumer device. Instructions running on the processor also can cause the processor of the concierge device to receive alert messages regarding interruption of a task being performed by an in-home consumer device. The concierge device can be configured to emit an audible alert or display a message in response to the alert messages.

Instructions running on the processor further can cause the processor of the concierge device to check for updates to the control menus without need for user intervention.

Implementation #21

Another implementation describes a method including: receiving an identification of an unregistered consumer device from which at least a make and model of the consumer device can be determined; registering the consumer device using the identification received; and automatically configuring a home control device with menus and control codes that control the consumer device and with support information, wherein the home control device includes one or more input sensors and a display.

This implementation optionally includes, responsive to a single user action sensed by the input sensors, the home control device initiating contact with a service center that supports the consumer device, including automatically transmitting information from which the service center can identify the consumer device and determine whether to engage an automated support protocol based on the consumer device to be supported.

This method and other implementations of the technology disclosed can each optionally include one or more of the following features.

Other implementations include: automatically transmitting status information regarding the consumer device to the service center; and displaying information received from the service center during the automated support protocol.

In some implementations, the wherein the home control device is coupled in communication with the service center by an in-home support gateway; and the method further includes the in-home support gateway relaying communications between home control device and the service center.

In other implementations, the home control device is coupled in communication with a cloud-based support gateway via a network that extends beyond the home and the method further includes the cloud-based support gateway implementing the registering of the consumer device and the automatically configuring of the home control device.

Some implementations further include causing the consumer device to be coupled in data communication with the support center, thereby allowing diagnostic communications between the consumer device and the support center.

A support call can be conducted using the home control device to capture the user's voice and to reproduce audio for the user to hear. It can use at least one video camera on the home control device to provide visual information to the support center during the support call.

Further implementations include the home control device receiving a data stream from the consumer device and displaying information from the data stream on the home control device in coordination with interactions between the home control device and the consumer device.

When the consumer device is a television or video image source coupled to a monitor, the information displayed on the home control device display can be coordinated with images displayed on the television or monitor.

The information displayed on the home control device can identify a company or product and can be coordinated with product placement in an advertisement or program scene. Or it can be coordinated with subject matter of an advertisement or program scene.

Information can be displayed on the home control device as a user navigates through content by fast forwarding, rewinding or skipping.

Implementation #22

Some implementations describe a system including: at least one wireless data communication adapter, one or more input sensors, one or more outputs, and memory; and at least one processor configured to perform operations. The operations are including: receiving an identification of an unregistered consumer device from which at least a make and model of the consumer device can be determined; registering the consumer device using the identification received; and automatically configuring a home control device with menus and control codes that control the consumer device and with support information, wherein the home control device includes one or more input sensors and a display. In this system, responsive to a single user action sensed by the input sensors, the home control device initiating contact with a service center that supports the consumer device, including automatically transmitting information from which the service center can identify the consumer device and determine whether to engage an automated support protocol based on the consumer device to be supported.

This system and other implementations of the technology disclosed can each optionally include one or more of the following features.

In some implementations, the system further includes the processor configured to perform operations including: automatically transmitting status information regarding the consumer device to the service center; and displaying information received from the service center during the automated support protocol.

Some system implementations further include an in-home support gateway that comprises at least one gateway processor configured to perform operations including relaying communications between home control device and the service center. In these implementations, the home control device can be coupled in communication with the service center by through the in-home support gateway. The gateway processor can be further configured to perform operations that implement the registering of the consumer device and the automatically configuring of the home control device.

Other system implementations further include a cloud-based support gateway that comprises at least one gateway processor configured to perform operations that implement the registering of the consumer device and the automatically configuring of the home control device. In these implementations, the home control device is coupled in communication with the cloud-based support gateway via a network that extends beyond the home.

The processor used can be further configured to perform operations including causing the consumer device to be coupled in data communication with the support center, thereby allowing diagnostic communications between the consumer device and the support center.

The processor on the home control device can be further configured to perform operations including conducting a support call with the support processor regarding the consumer device using the home control device to capture the user's voice and to reproduce audio for the user to hear. The processor on the home control device can be further configured to perform operations including using at least one video camera on the home control device to provide visual information to the support center during the support call.

Any of these implementations can further include the processor on the home control device is further configured to perform operations including receiving a data stream from the consumer device and displaying information from the data stream on the home control device in coordination with interactions between the home control device and the consumer device. When the consumer device is a television or video image source coupled to a monitor, the information displayed on the home control device display can be coordinated with images displayed on the television or monitor. The information displayed on the home control device can identify a company or product and is coordinated with product placement in an advertisement or program scene. Or it can be coordinated with subject matter of an advertisement or program scene. The information can be displayed on the home control device as a user navigates through content by fast forwarding, rewinding or skipping.

Other implementations may include a non-transitory computer readable storage medium storing instructions executable by a processor to perform a method as described above. Yet another implementation may include a method including actions implemented by the processors of the device of system as described above.

Implementation #23

Some implementations describe a method of delivering information to a consumer, including: pairing a concierge device with a consumer electronic (abbreviated CE) device via a two-way wireless RF connection; the concierge device receiving a data stream from the CE device and displaying information from the data stream on a display integral to the remote control.

This method and other implementations of the technology disclosed can each optionally include one or more of the following features.

In some implementations, the concierge device relies on the CE device to transcode information from an MPEG transmission stream into a simplified concierge device format.

As above, when the consumer device is a television or video image source coupled to a monitor, the information can be displayed on the concierge device display is coordinated with images displayed on the television or monitor. Other features of information displayed apply to this method as well as the prior methods.

| TABLE OF CONTENTS | |
|---|---|
| Consumer Electronic REGISTRATION, CONTROL AND Support Concierge Device and Method | 1 |
| RELATED APPLICATIONS | 1 |
| BACKGROUND | 2 |
| SUMMARY | 3 |
| BRIEF DESCRIPTION OF THE DRAWINGS | 3 |
| DETAILED DESCRIPTION | 4 |
| Concierge Device Range of Capabilities | 4 |
| Easy On Boarding Devices to Home Automation | 5 |
| Authenticated On Boarding | 5 |
| Virtual Apps-Downloaded Menus | 8 |
| Concierge Device for One Action Support | 8 |
| Associating (Linking) the Concierge Device and Consumer Devices | 11 |
| Example of Support Session Implementation | 12 |
| Description of Figures | 13 |
| Problems and Solutions | 18 |
| Sample Support Dialogs | 20 |
| Problems with a TV | 20 |
| Problems with the Washing Machine | 23 |
| High Level Description | 24 |
| The Concierge Connect Button | 24 |
| Device Management | 24 |
| Enhanced Concierge Device Configuration | 25 |
| Advertising Options on a Concierge Device with a Display | 25 |

-continued

| TABLE OF CONTENTS | |
|---|---|
| Example and Summary of Main Demo Screens | 29 |
| Home Screen | 29 |
| Screen 1 | 30 |
| Screen 2 | 30 |
| Screen 3 | 30 |
| Screen 4 | 30 |
| Screen 5 | 30 |
| Screen 6 | 30 |
| Screen 7 | 31 |
| Some Particular Embodiments | 31 |
| Single Action Support | 31 |
| Implementation #1 | 31 |
| Implementation #2 | 33 |
| Implementation #3 | 34 |
| Implementation #4 | 35 |
| Implementation #5 | 35 |
| Implementation #6 | 36 |
| Implementation #7 | 37 |
| Implementations #8 | 38 |
| Implementations #9-10 | 38 |
| Implementation #11 | 39 |
| Implementation #12 | 40 |
| Implementation #13 | 41 |
| On Boarding Claims | 43 |
| Implementation #14 | 43 |
| Implementation #15 | 45 |
| Implementation #16 | 46 |
| Implementation #17 | 47 |
| Implementation #18 | 48 |
| Implementation #19 | 49 |
| Virtual Apps and Advertising | 51 |
| Implementation #20 | 51 |
| Implementation #21 | 53 |
| Implementation #22 | 54 |
| Implementation #23 | 56 |
| CLAIMS | 57 |
| ABSTRACT | 58 |

I claim as follows:

1. A concierge device including at least one processor and memory holding computer instructions that, when executed on one or more processors of the concierge device, cause performance of a method of supporting a device, the method including:

responsive to a user action directed to the concierge device, selecting a particular device to support;

connecting to and retrieving data from the selected device via a first two-way non-audio data channel;

responsive to a user action requesting an interactive support session, determining a service center with which to initiate the interactive support session and initiating or scheduling the interactive support session, including caching identifier information from which the service center can uniquely identify the particular device;

connecting the concierge device in the interactive support session with the service center and transmitting the identifier information, wherein the service center initiates support of the particular device in the interactive support session, conducted using a two-way audio channel between the service center and the concierge device and a second two-way non-audio data channel;

conducting the interactive support session with the determined service center regarding the particular device, using the concierge device to capture a user's voice and relay the user's voice to the determined service center and using the concierge device to reproduce audio from the determined service center for the user to hear via the two-way audio channel; and during the interactive support session, the determined service center requesting diagnostic information about the particular device and receiving responses including the diagnostic information requested via the second two-way non-audio data channel.

2. The concierge device of claim 1, further including program instructions that cause the service center to participate in a voice and data interaction with an artificial intelligence system conducting an automated support protocol, the interaction including the concierge device, the consumer device and the service center.

3. The concierge device of claim 1, holding computer instructions that when executed, cause performance of the method further including receiving from a user interface of the concierge device a user selection of the particular device to be supported from a plurality of devices.

4. The concierge device of claim 1, wherein the program instructions run on hardware of the concierge device that is physically incorporated in the consumer device.

5. The concierge device of claim 1, wherein the program instructions cause the concierge device to execute the method further including sending control commands to the particular device.

6. The concierge device of claim 1, further including program instructions that prompt the service center to determine positively to engage an automated support protocol based on the particular device to be supported and the user.

7. The concierge device of claim 1, further including program instructions to cause the service center to determine to bypass an interactive voice recognition system based on determination of the consumer device.

8. The concierge device of claim 1, further including program instructions that prompt the service center to bypass an interactive voice recognition system and to engage the user with a live person based on determination of the particular device.

9. A non-transitory computer readable media, impressed with program instructions that, when executed on hardware, cause the hardware to execute a method of supporting a device using a concierge device in communication with a service center, the method including:
responsive to a user action directed to the concierge device, selecting a particular device to support;
connecting to and retrieving data from the selected device via a first two-way non-audio data channel;
responsive to a user action requesting an interactive support session, determining a service center with which to initiate the interactive support session and initiating or scheduling the interactive support session, including caching identifier information from which the determined service center can uniquely identify the particular device;
connecting the concierge device with the determined service center and transmitting the identifier information, wherein the service center initiates support of the particular device in the interactive support session, conducted using a two-way audio channel between the service center and the concierge device and a second two-way non-audio data channel;
conducting the interactive support session regarding the particular device, using the concierge device to capture a user's voice and relay the user's voice to the determined service center and using the concierge device to reproduce audio from the determined service center for the user to hear via the two-way audio channel; and
during the interactive support session, the service center requesting diagnostic information about the particular device and receiving responses including the diagnostic information requested via the second two-way non-audio data channel.

10. The non-transitory computer readable media of claim 9, further including program instructions that cause the service center to participate in a voice and data interaction with an artificial intelligence system conducting an automated support protocol, the interaction including the concierge device, the consumer device and the service center.

11. The non-transitory computer readable media of claim 9, holding computer instructions that when executed, cause performance of the method further including receiving from a user interface of the concierge device a user selection of the particular device to be supported from a plurality of devices.

12. The non-transitory computer readable media of claim 9, wherein the program instructions run on hardware of the concierge device that is physically incorporated in the consumer device.

13. The non-transitory computer readable media of claim 9, wherein the program instructions cause the concierge device to execute the method further including sending control commands to the particular device.

14. The non-transitory computer readable media of claim 9, further including program instructions that prompt the service center to determine positively to engage an automated support protocol based on the particular device to be supported and the user.

15. The non-transitory computer readable media of claim 9, further including program instructions to cause the service center to determine to bypass an interactive voice recognition system based on determination of the consumer device.

16. The non-transitory computer readable media of claim 9, further including program instructions that prompt the service center to bypass an interactive voice recognition system and to engage the user with a live person based on determination of the particular device.

17. A method using a concierge device to supporting a particular device, the method including:
responsive to a user action directed to the concierge device, selecting a particular device to support;
connecting to and retrieving data from the selected device via a first two-way non-audio data channel;
responsive to a user action requesting an interactive support session, determining a service center with which to initiate the interactive support session and initiating or scheduling the interactive support session, including caching identifier information from which the service center can uniquely identify the particular device;
connecting the concierge device in the interactive support session with the service center and transmitting the identifier information, wherein the service center initiates support of the particular device in the interactive support session, conducted using a two-way audio channel between the service center and the concierge device and a second two-way non-audio data channel;
conducting the interactive support session with the determined service center regarding the particular device, using the concierge device to capture a user's voice and relay the user's voice to the determined service center and using the concierge device to reproduce audio from the determined service center for the user to hear via the two-way audio channel; and
during the interactive support session, the determined service center requesting diagnostic information about the particular device and receiving responses including the diagnostic information requested via the second two-way non-audio data channel.

18. The method of claim 17, further including causing the service center to participate in a voice and data interaction with an artificial intelligence system conducting an automated support protocol, the interaction including the concierge device, the consumer device and the service center.

19. The method of claim 17, holding computer instructions that when executed, cause performance of the method further including receiving from a user interface of the concierge device a user selection of the particular device to be supported from a plurality of devices.

20. The method of claim 17, wherein the program instructions run on hardware of the concierge device that is physically incorporated in the consumer device.

21. The method of claim 17, wherein the program instructions cause the concierge device to execute the method further including sending control commands to the particular device.

22. The method of claim 17, further including program instructions that prompt the service center to determine positively to engage an automated support protocol based on the particular device to be supported and the user.

23. The method of claim 17, further including program instructions to cause the service center to determine to bypass an interactive voice recognition system based on determination of the consumer device.

24. The method of claim 17, further including program instructions that prompt the service center to bypass an interactive voice recognition system and to engage the user with a live person based on determination of the particular device.

* * * * *